United States Patent
Shimada

(10) Patent No.: US 7,165,089 B2
(45) Date of Patent: Jan. 16, 2007

(54) MAIL SERVER PROVIDING INFORMATION ON ELECTRONIC MAIL FOR SHARING THE ELECTRONIC MAIL

(75) Inventor: Hirokatsu Shimada, Yokohama (JP)

(73) Assignee: Minolta Co., Ltd., Osaka (JP)

( * ) Notice: Subject to any disclaimer, the term of this patent is extended or adjusted under 35 U.S.C. 154(b) by 815 days.

(21) Appl. No.: 10/211,264

(22) Filed: Aug. 5, 2002

(65) Prior Publication Data

US 2003/0033372 A1 Feb. 13, 2003

(30) Foreign Application Priority Data

Aug. 9, 2001 (JP) .............................. 2001-242507

(51) Int. Cl.
*G06F 15/16* (2006.01)
(52) U.S. Cl. ...................... 709/203; 709/206
(58) Field of Classification Search ................ 709/203, 709/206, 207, 217–219, 227
See application file for complete search history.

(56) References Cited

U.S. PATENT DOCUMENTS 6,327,612 B1 * 12/2001 Watanabe ................... 709/206
6,480,884 B1 * 11/2002 Saito .......................... 709/207
6,505,236 B1 * 1/2003 Pollack ....................... 709/206
6,618,747 B1 * 9/2003 Flynn et al. ................. 709/206
2002/0046250 A1 * 4/2002 Nassiri ........................ 709/206
2002/0059382 A1 * 5/2002 Yamaguchi et al. ......... 709/206

FOREIGN PATENT DOCUMENTS

| JP | 11-212884 | 8/1999 |
| JP | 2000-322340 | 11/2000 |
| JP | 2001-022678 | 1/2001 |
| JP | 2001-067285 | 3/2001 |

* cited by examiner

*Primary Examiner*—Khanh Dinh
*Assistant Examiner*—Van Kim T. Nguyen
(74) *Attorney, Agent, or Firm*—Buchanan Ingersoll & Rooney PC

(57) ABSTRACT

Upon reception of an electronic mail, a mail server analyzes header information. If a header portion includes no broadcasting destination (CC, BCC destination), a normal mail transmission process is performed. If the header portion includes a broadcasting destination, the mail is stored by associating it with a TO destination, and Web data including the mail information is created. When the TO destination draws out that mail from the mail server, the mail server registers the Web data in a viewable directory. Thus, the Web data is updated. The mail server further creates and sends an electronic mail notifying the broadcasting destination that the mail has been viewable.

21 Claims, 19 Drawing Sheets

| PROJECT NAME | ProjectX |
|---|---|
| PROJECT NUMBER | ------------- |
| ADDRESS OF BULLETIN BOARD | http://www.xxx.xxx/xx |
| ⋮ | ⋮ |

| PROJECT MEMBER NAME | MEMBER ID | MAIL ADDRESS | PASSWORD |
|---|---|---|---|
| Tanaka | 1111 | ----- | xxxxxxxxx |
| Yamamoto | 2222 | ----- | ++++++++++ |
| Terada | 3333 | ----- | ********* |
| Iida | 4444 | ----- | ooooooooo |
| Mori | 5555 | ----- | ---------- |

MAIL SERVER PROVIDING INFORMATION ON ELECTRONIC MAIL FOR SHARING THE ELECTRONIC MAIL

This application is based on Japanese Patent Application No. 2001-242507, the entire content of which is hereby incorporated by reference.

BACKGROUND OF THE INVENTION

1. Field of the Invention

The present invention relates to a mail server and a program product for the mail server, and more particularly, to a mail server that allows appropriate sharing of an electronic mail and a program product for the mail server.

2. Description of the Related Art

As the Internet has recently become widespread, use of an electronic mail has been generalized in transmission of business-related information.

When information is transmitted via an electronic mail, a document or a file can be sent to one party (TO destination), or can be broadcast to a plurality of parties (CC; Carbon Copy and BCC; Blind Carbon Copy). An electronic mail including business information is often broadcast to all members constituting a unit such as a department or section in an office only for reference, such that the members can share the information included in the electronic mail.

When an electronic mail is sent to a plurality of parties as described above, however, a party at a broadcast destination may acquire the contents of the electronic mail before a party at a TO destination acquiring the same. That is, the contents of the electronic mail may first be read by the party at the broadcast destination who received the mail only for reference before the party at the TO destination who is an actual party to receive the information. If this happens, the party at the broadcast destination may proceed to work or may respond to the electronic mail by assuming that the party at the TO destination has already had a good grasp of the contents of the electronic mail. Such confusion in the order of transmission causes various detrimental effects in business.

SUMMARY OF THE INVENTION

An object of the present invention is, therefore, to provide a mail server allowing more appropriate sharing of information, and a program product for the mail server.

The above-described object of the present invention is achieved by a mail server including the components below. According to one aspect of the present invention, the mail server includes an address extraction portion to extract a TO address, a CC address and a BCC address designated as destinations from a received electronic mail; a body information extraction portion to extract body information from the received electronic mail; a storage portion to store the extracted body information in a viewable state; a mail creation portion to create a first electronic mail having the extracted TO address as a destination and including the body information, and a second electronic mail having one of the extracted CC address and BCC address as a destination for notifying that the extracted body information is stored in the storage portion; and a controller to provide control such that the created first electronic mail is sent, the extracted body information is stored into the storage portion, and the second electronic mail is sent, when at least one of the CC address and BCC address is designated as a destination for the received electronic mail.

Preferably, the controller provides control such that the extracted body information is stored into the storage portion in a viewable state after the first electronic mail is sent or drawn out.

More preferably, the controller provides control such that the second electronic mail is sent after the first electronic mail is sent or drawn out. More preferably, the mail creation portion attaches a request for reception confirmation to the first electronic mail, when the extracted TO address is an address required to be transferred to another mail server. The controller provides control such that the extracted body information is stored into the storage portion in a viewable state, after the reception confirmation for the first electronic mail is performed.

More preferably, the mail creation portion attaches a request for reception confirmation to the first electronic mail, when the extracted TO address is an address required to be transferred to another mail server. The controller provides control such that the second electronic mail is sent after the reception confirmation for the first electronic mail is performed.

According to another aspect of the present invention, a program product for a mail server includes an address extraction step of extracting, from a received electronic mail, a TO address, a CC address and a BCC address that are designated as destinations; a determination step of determining whether or not one of the CC address and the BCC address is designated for the received electronic mail; a body information extraction step of extracting body information from the received electronic mail, if it is determined in the determination step that at least one of the CC address and BCC address is designated for the received electronic mail; a first transmission step of sending a first electronic mail including the body information to the extracted TO address; a storing step of storing the extracted body information into a storage portion in a viewable state; and a second transmission step of sending a second electronic mail to one of the extracted CC address and BCC address for notifying that the extracted body information is stored in the storage portion.

Preferably, the storing step stores the extracted body information into the storage portion in a viewable state after the first electronic mail is sent or drawn out.

More preferably, the second transmission step sends the second electronic mail after the first electronic mail is sent or drawn out.

More preferably, the first transmission step sends the first electronic mail with a request for reception confirmation attached, when the extracted TO address is an address required to be transferred to another mail server. The storing step stores the body information into the storage portion in a viewable state after the reception confirmation for the first electronic mail is performed.

More preferably, the first transmission step sends the first electronic mail with a request for reception confirmation attached, when the extracted TO address is an address required to be transferred to another mail server. The second transmission step sends the second electronic mail after the reception confirmation of the first electronic mail is performed.

According to a further aspect of the present invention, a mail server includes an address extraction portion to extract, from a received electronic mail, a TO address designated as a destination and information on a group constituted by a predetermined user; a body information extraction portion to extract body information from the received electronic mail; a storage portion to store the extracted body information in a viewable state; a mail creation portion to create a first electronic mail having the extracted TO address as a destination and including the body information, and a second electronic mail having the predetermined user constituting the extracted group as a destination for notifying that the extracted body information is stored in the storage portion; and a controller to provide control such that the created first electronic mail is sent, the extracted body information is stored into the storage portion, and the second electronic mail is sent, when information on the group is designated as a destination for the received electronic mail.

Preferably, the controller provides control such that the extracted body information is stored into the storage portion in a viewable state, after the first electronic mail is sent or drawn out.

More preferably, the controller provides control such that the second electronic mail is sent after the first electronic mail is sent or drawn out.

More preferably, the mail creation portion attaches a request for reception confirmation to the first electronic mail, when the extracted TO address is an address required to be transferred to another mail server. The controller provides control such that the extracted body information is stored into the storage portion in a viewable state, after the reception confirmation for the first electronic mail is performed.

More preferably, the mail creation portion attaches a request for reception confirmation to the first electronic mail, when the extracted TO address is an address required to be transferred to another mail server. The controller provides control such that the second electronic mail is sent after the reception confirmation for the first electronic mail is performed.

According to yet another aspect of the present invention, a program product for a mail server includes an address extraction step of extracting, from a received electronic mail, a TO address designated as a destination and information on a group constituted by a predetermined user; a determination step of determining whether or not the information on the group is designated for the received electronic mail; a body information extraction step of extracting body information from the received electronic mail, when it is determined at the determination step that the information on the group is designated for the received electronic mail; a first transmission step of sending a first electronic mail including the body information to the extracted TO address; a storing step of storing the extracted body information into a storage portion in a viewable state; and a second transmission step of sending a second electronic mail to the predetermined user constituting the extracted group for notifying that the extracted body information is stored in the storage portion.

Preferably, the storing step stores the extracted body information into the storage portion in a viewable state after the first electronic mail is sent or drawn out.

More preferably, the second transmission step sends the second electronic mail after the first electronic mail is sent or drawn out.

More preferably, the first transmission step sends the first electronic mail with a request for reception confirmation attached, when the extracted TO address is an address required to be transferred to another mail server. The storing step stores the extracted body information into the storage portion in a viewable state after the reception confirmation for the first electronic mail is performed.

More preferably, the first transmission step sends the first electronic mail with a request for reception confirmation attached, when the extracted TO address is an address required to be transferred to another mail server. The second transmission step sends the second electronic mail after the reception confirmation of the first electronic mail is performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
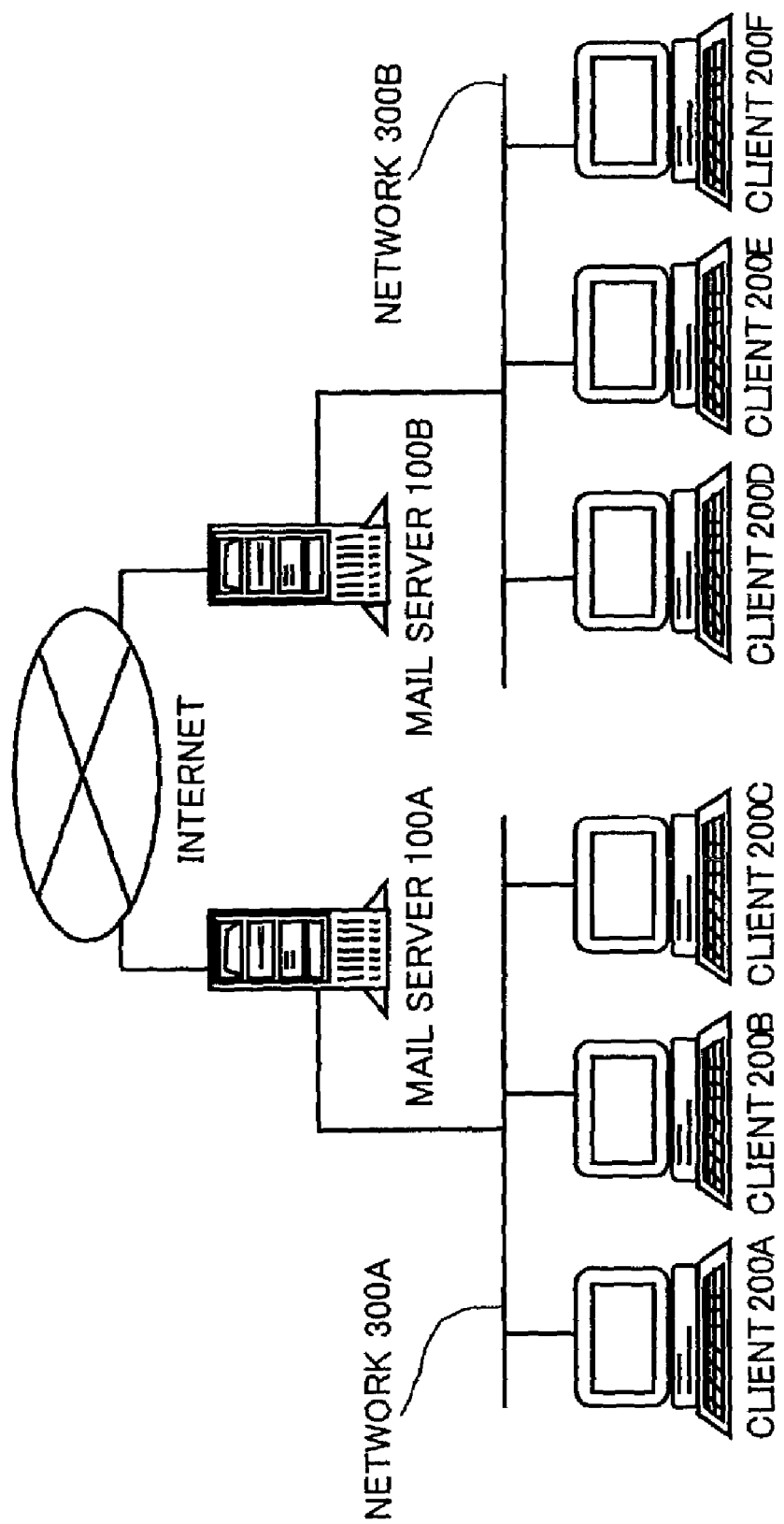
FIG. 1 shows a configuration of a mail system according to the first embodiment.

Referring to FIG. 1, a mail system in the present embodiment includes mail servers 100A, 100B, client devices 200A, 200B, 200C, 200D, 200E and 200F, networks 300A and 300B connecting the mail servers and the client devices, and the Internet. Electronic mails are transmitted and received between client devices 200. The transmission and reception of mails between client devices 200 are performed over the Internet or networks 300A and 300B, based on a prescribed protocol.

Mail server 100 can communicate with a plurality of client devices 200 via network 300, and provides services of collecting and distributing mails from/to each client device 200. It is noted that mail server 100 also serves as an SMTP (Simple Mail Transfer Protocol) server, a POP (Post Office Protocol) 3 server, an IMAP (Internet Messaging Access Protocol) 4 server and the like. The SMTP server sends an electronic mail to client device 200 in another network 300. The POP 3 server and IMAP 4 server handle a reception request from the user.

Network 300 may be an LAN (Local Area Network) such as Ethernet (R), a token ring and FDDI (Fiber Distributed Data Interface), or may be a WAN (Wide Area Network) in which several LANs are connected. Moreover, network 300 may either be wired or wireless.

Figure 2:
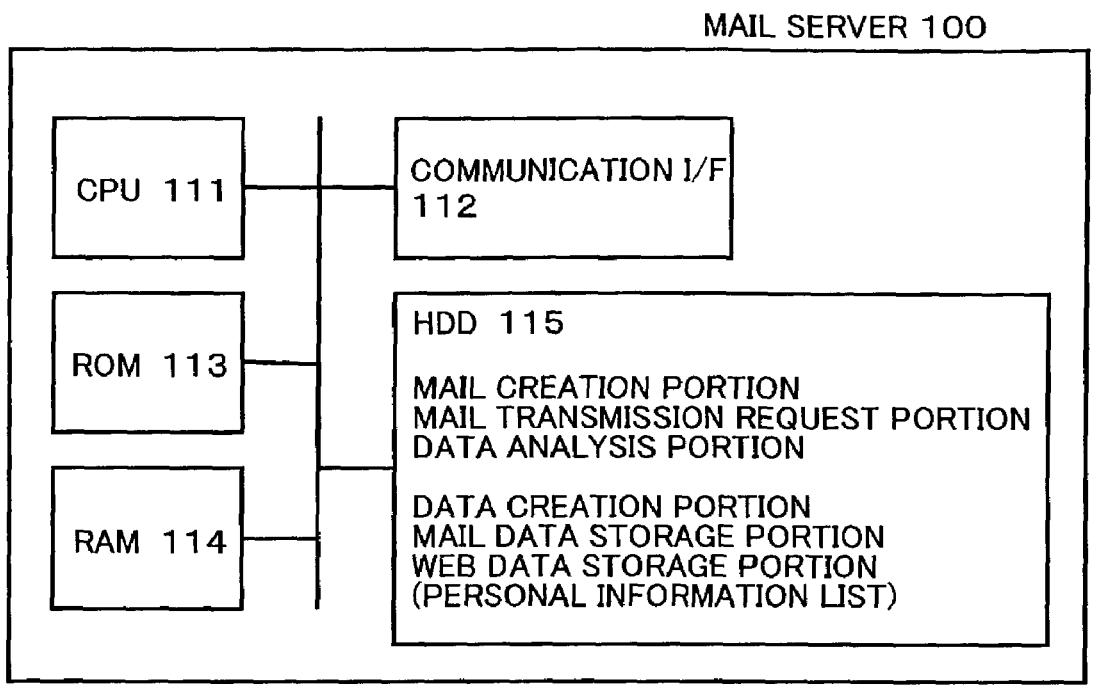
FIG. 2 is a block diagram showing a specific example of the configuration according to the first embodiment in a mail server 100 shown in FIG. 1.

Referring now to FIG. 2, mail server 100 includes a CPU (Central Processing Unit) 111, a ROM (Read Only Memory) 113, a RAM (Random Access Memory) 114, a communication I/F (interface) 112 and an HDD (Hard Dick Drive) 115.

CPU 111 controls the entire mail server 100.

ROM 113 is a non-volatile storage device storing a program executed by CPU 111.

RAM 114 is a rewritable storage device used as a work area required by CPU 111 executing a process.

Communication I/F 112 is an interface for communication with the outside, through which mail server 100 communicates with other machines such as client device 200 via network 300 or the Internet.

HDD 115 is a large capacity storage device storing an application software such as a mail information providing program, and other data.

In a prescribed area in HDD 115, mail data storage portion storing mail data and a Web data storage portion storing Web data as well as personal information are provided. It is noted that the mail information providing program stored in HDD 115 includes, as software components, a mail creation portion creating a mail, a mail transmission request portion issuing a transmission request for a mail, a data analysis portion analyzing address information and a data creation portion creating Web data and the like.

Figure 3:
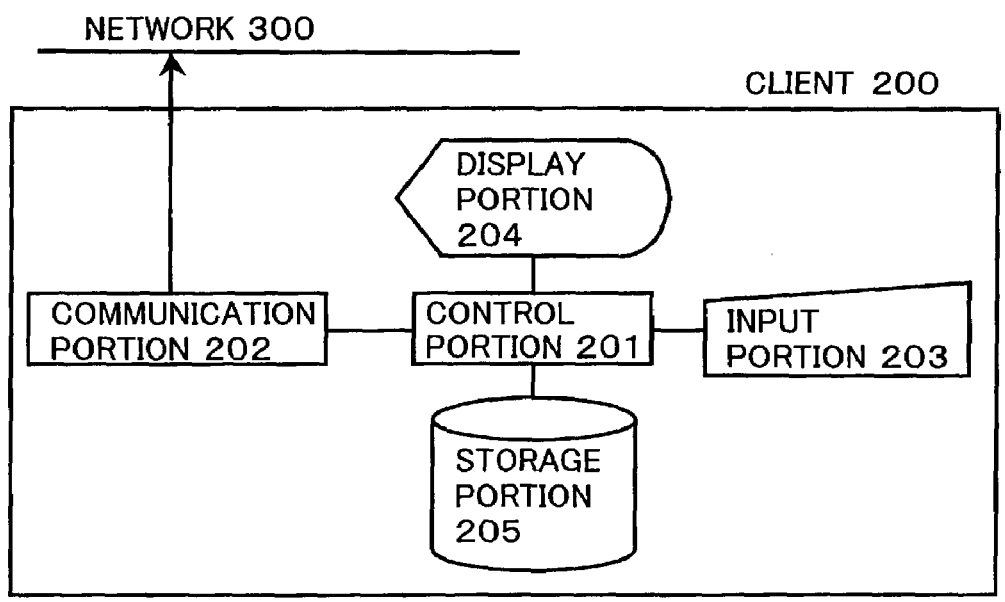
FIG. 3 shows a specific example of a configuration of each of client devices 200A to 200C shown in FIG. 1.

FIG. 3 shows client device 200 that represents one of client devices 200A to 200F. It is noted that client device 200 has a configuration of a general personal computer, which may include components other than those shown in FIG. 3.

Referring to FIG. 3, client device 200 includes a control portion 201, a communication portion 202, an input portion 203, a display portion 204 and a storage portion 205.

Control portion 201 controls the entire client device 200.

Communication portion 202 communicates with mail server 100 and the like via network 300.

Input portion 203 is constituted by a mouse, a keyboard or the like, accepting an entry by the user.

Display portion 204 is constituted by a CRT (Cathode Ray Tube) display device, a liquid crystal display or the like, displaying various information.

Storage portion 205 is constituted by an FDD (Flexible Disk Drive), an HDD, a RAM, a ROM or the like, storing a program executed at control portion 201, various information and the like.

Operation of mail server 100 shown in FIG. 2 in providing mail information is described with reference to the flowchart in FIG. 4. Note that this process is achieved by CPU 111 executing a program stored in ROM 113.

Figure 4:
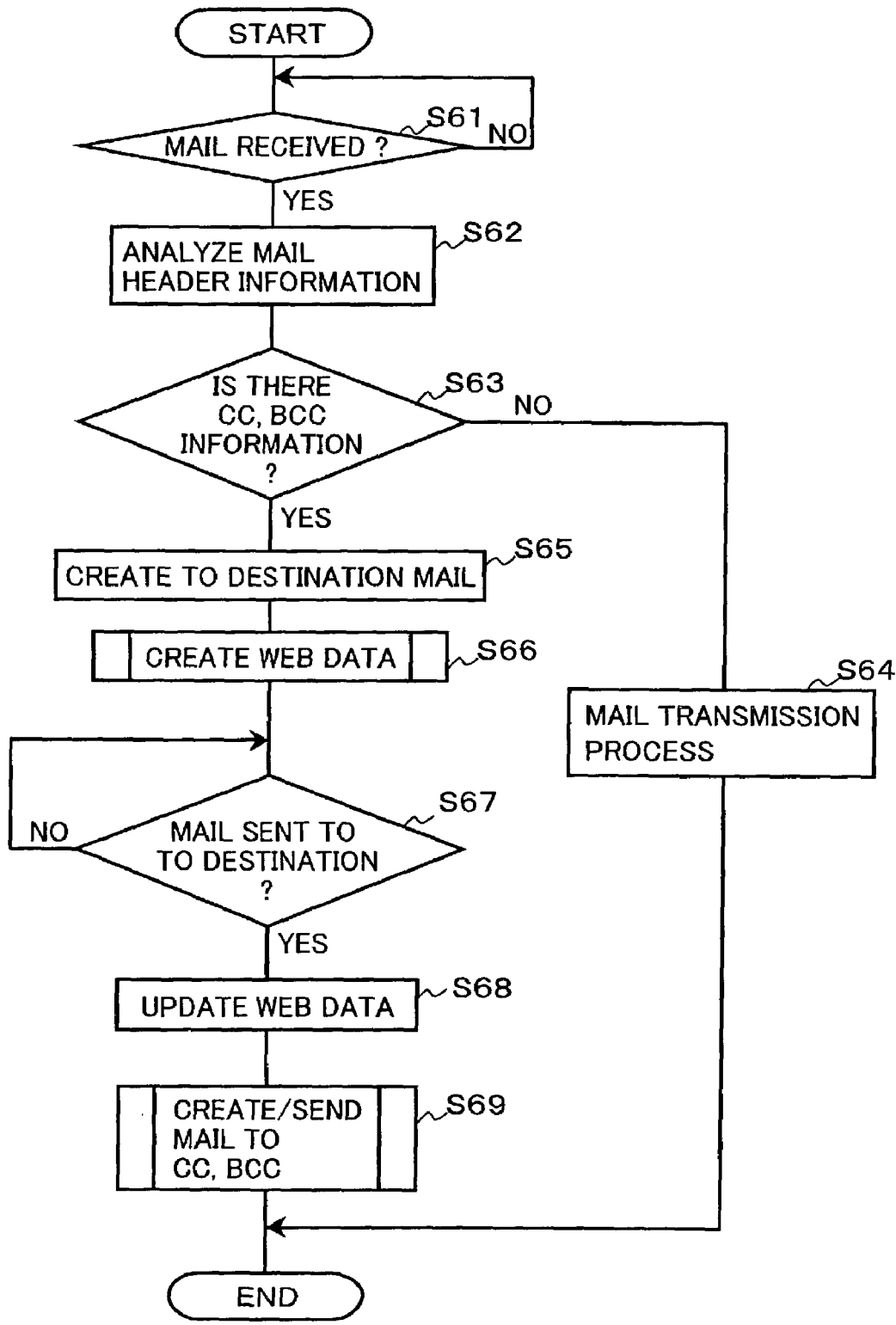
FIG. 4 is a flowchart illustrating a process for providing mail information in mail server 100 according to the first embodiment.

Referring to FIG. 4, when CPU 111 in mail server 100 receives a mail (Yes at S61), it analyzes destination address information of the received mail (S62). That is, CPU 111 analyzes information on the header portion of the mail to determine whether or not it includes a TO address, a CC address and a BCC address.

If it is determined that there is no destination address other than TO address, such as a CC address, a BCC address or the like (No at S63), mail server 100 performs a normal mail transmission process to a destination designated by the TO address (S64). The process is then terminated.

On the contrary, if it is determined that there is a destination address other than the TO address, such as a CC address, a BCC address or the like (Yes at S63), mail server 100 creates and sends a mail to the destination designated by the TO address (S65). Specifically, if the TO address is an address of client device 200 within the network to which mail server 100 belongs, server 100 deletes the CC address and BCC address, and rewrites the header portion such that the mail is sent only to the destination designated by the TO address. Thereafter, mail server 100 stores the mail by associating it with the destination designated by the TO address, and waits for the user at the TO address drawing out the mail. If the TO address is not an address of client device 200 within the network to which mail server 100 belongs, server 100 deletes the CC address and BCC address, and rewrites the header portion such that the mail is sent only to the destination designated by the TO address, while adding a request for a delivery report or disposition notification to the header portion. The mail with the edited header portion is then sent to a POP server or an IMAP server in a network to which the TO address belongs.

Next, mail server 100 creates Web data for the destination designated by the CC address or BCC address to view the contents of the mail on an electronic bulletin board (S66). Moreover, mail server 100 registers the created Web data in a prescribed area (Web data storage portion) in HDD 115 in mail server 100. It is noted that the process of creating Web data performed at step S66 will be described later in detail in conjunction with a flow chart.

At this point, the Web data created at step S66 cannot be viewed on the Web, since it is registered in a directory that allows no viewing.

If the TO address is an address of client device 200 within the network to which mail server 100 belongs, server 100 monitors whether or not the mail stored at step S65 is drawn out by the user at the destination designated by the TO address (S67). If the mail is drawn out (Yes at S67), mail server 100 transfers the Web data created at step S66 to a viewable directory. This allows the Web data to be updated (S68) and to be viewed on the Web.

If, at step S67, the TO address is not an address of client device 200 within the network to which server 100 belongs, server 100 determines that the mail has been sent to the destination designated by the TO address, in response to reception of a distribution-confirming mail, i.e. a mail for confirming that a mail has been distributed, from the POP server or the IMAP server in the network to which the TO address belongs or an opening-confirming mail, i.e. a mail for confirming that a mail has opened, from the destination designated by the TO address (Yes at S67), and updates the Web data (S68).

If the TO address includes a plurality of destinations, it is determined at step S67 whether or not a mail is sent to all destinations designated by the TO address. The determination, however, may also be made for only one destination, e.g. the first destination.

When updating of the Web data is terminated at step S68, mail server 100 creates an electronic mail for notifying the user at destinations designated by the CC address and BCC address that the Web data has been registered (hereinafter referred to as "CC-incoming notice" or "CC-incoming notification"), and transmits the created mail (S69). Note that the process of creating and sending the CC-incoming notice at step S69 will be described later in detail in conjunction with a flow chart.

When the above-described transmission process is terminated, the process for providing mail information in mail server 100 is completed.

The process of creating Web data, performed at step S66 in FIG. 4, is further described with reference to the flow chart in FIG. 5.

Figure 5:
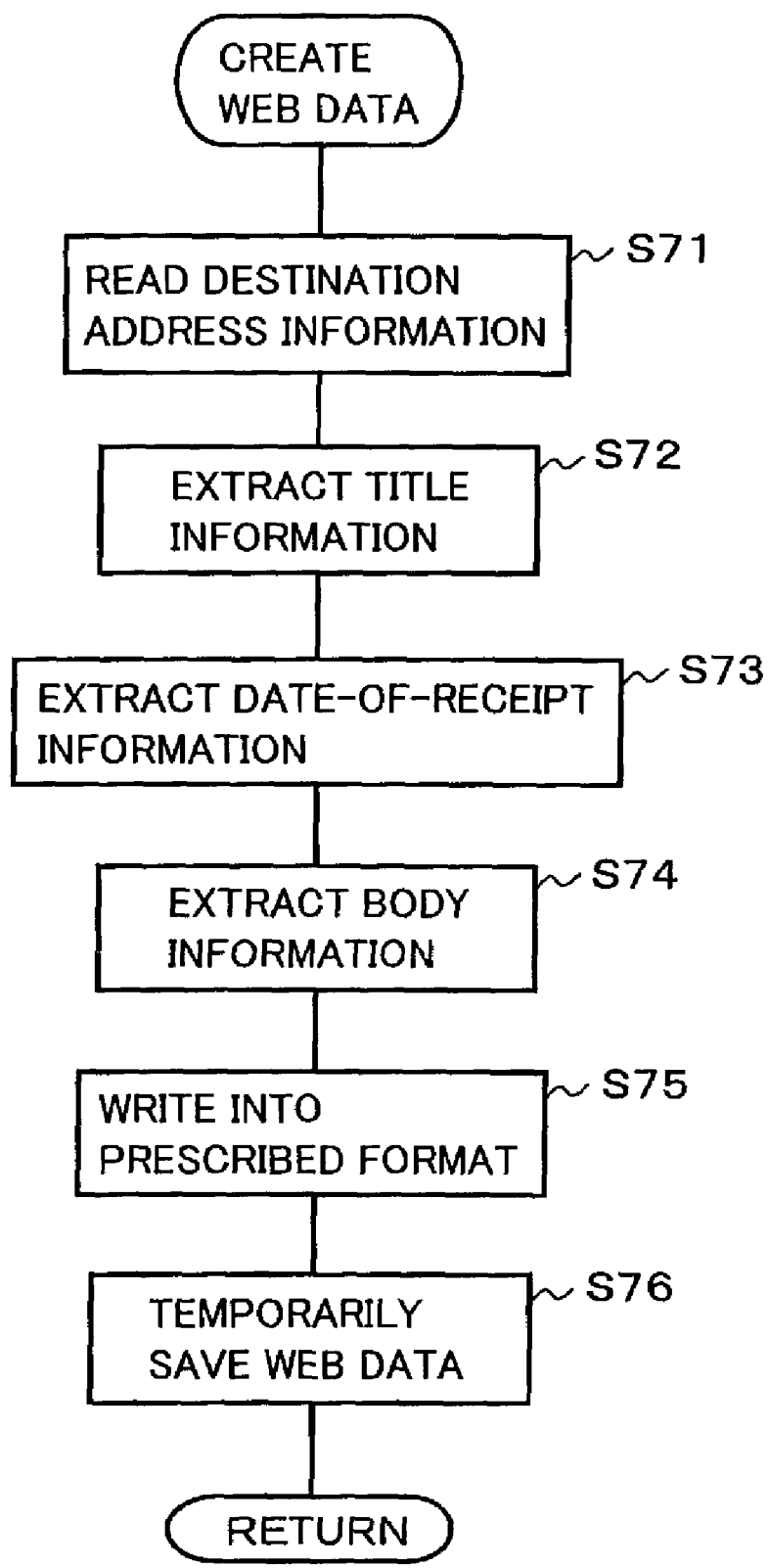
FIG. 5 is a flowchart illustrating a process of creating Web data, performed at a step S66 in FIG. 4.

Referring to FIG. 5, in CPU 111, mail server 100 extracts a destination address for an electronic mail (S71). That is, mail server 100 searches for character strings of "TO:," "CC:" and "BCC:" at the header portion in the electronic mail, and extracts the contents (character strings) following each of the retrieved character strings as destination address information.

Subsequently, mail server 100 searches for a character string of "Subject:" from the header portion in the electronic mail, and extracts the contents described under that item as title information (S72).

Next, mail server 100 detects a character string of "Received:" from the header portion in the electronic mail, and extracts date-of-receipt information described under that item (S73).

Further, mail server 100 extracts body information of the electronic mail in accordance with the contents of boundarystring and Content-Type (S74). Moreover, attached file information to the mail, if any, may be extracted as well in a similar manner.

Mail server 100 then temporarily saves the information extracted at steps S72 to S74 into a prescribed area (Web data storage portion) in HDD 115 (S76). A prescribed format is prepared in HDD 115 of mail server 100 for appropriate display on the Web browser. At saving, mail server 100 sequentially writes data into prescribed fields according to the format (S75). The prescribed format is, for example, an HTML format, and is prepared in advance within HDD 115.

After the process described above, the process of creating Web data is completed.

The process of creating and sending a CC-incoming notice at step S69 in FIG. 4 that is performed for the users at destinations designated by a CC address and a BCC address will be described with reference to the flowchart in FIG. 6. Here, the process of extracting destination address information at step S81, the process of extracting title information at step S82 and the process of extracting date-of-receipt information at step S83 are similar to the respective extraction processes shown in FIG. 5, i.e. steps S71, S72 and S73.

At step S81, mail server 100 searches for character strings of "TO:," "CC:" and "BCC:" from the header portion of the electronic mail, and extracts a character string following each of the retrieved character strings as destination address information. Next, at step S82, mail server 100 searches for a character string of "Subject:" from the header portion and extracts a character string following the retrieved character string as title information. At step S83, mail server 100 searches for a character string of "Received:" from the header portion, and extracts a character string following the retrieved character string as date-of-receipt information.

When the process of extracting each information is terminated, mail server 100 subsequently creates a CC-incoming notification mail for the user at a destination designated by a CC address or a BCC address (S84). That is, mail server 100 writes down one of the CC address information and BCC address information of the extracted destination address information into the CC-incoming notification mail as a TO address for the CC-incoming notification mail. Mail server 100 then adds "Notice of incoming CC" as a title (subject) to the CC-incoming notification mail, and writes down the extracted title information and date-of-receipt information to the body of the CC-incoming notification mail.

After thus creating the CC-incoming notification mail, mail server 100 sends the created CC-incoming notification mail to the user designated by the TO address (S85). Mail server 100 then repeats the mail creation process (step S84) and mail transmission process (step S85) in order to send the electronic mail to the users designated by all of the extracted CC addresses and BCC addresses until there is no more destinations to receive the mail (S86). After sending the CC-incoming notification mail to all the users designated by the extracted CC addresses and BCC addresses (No at step S86), mail server 100 terminates the process of creating and sending the CC-incoming notification mail.

Specific examples of the process of providing mail information will be described below for further clarification.

Figure 7:
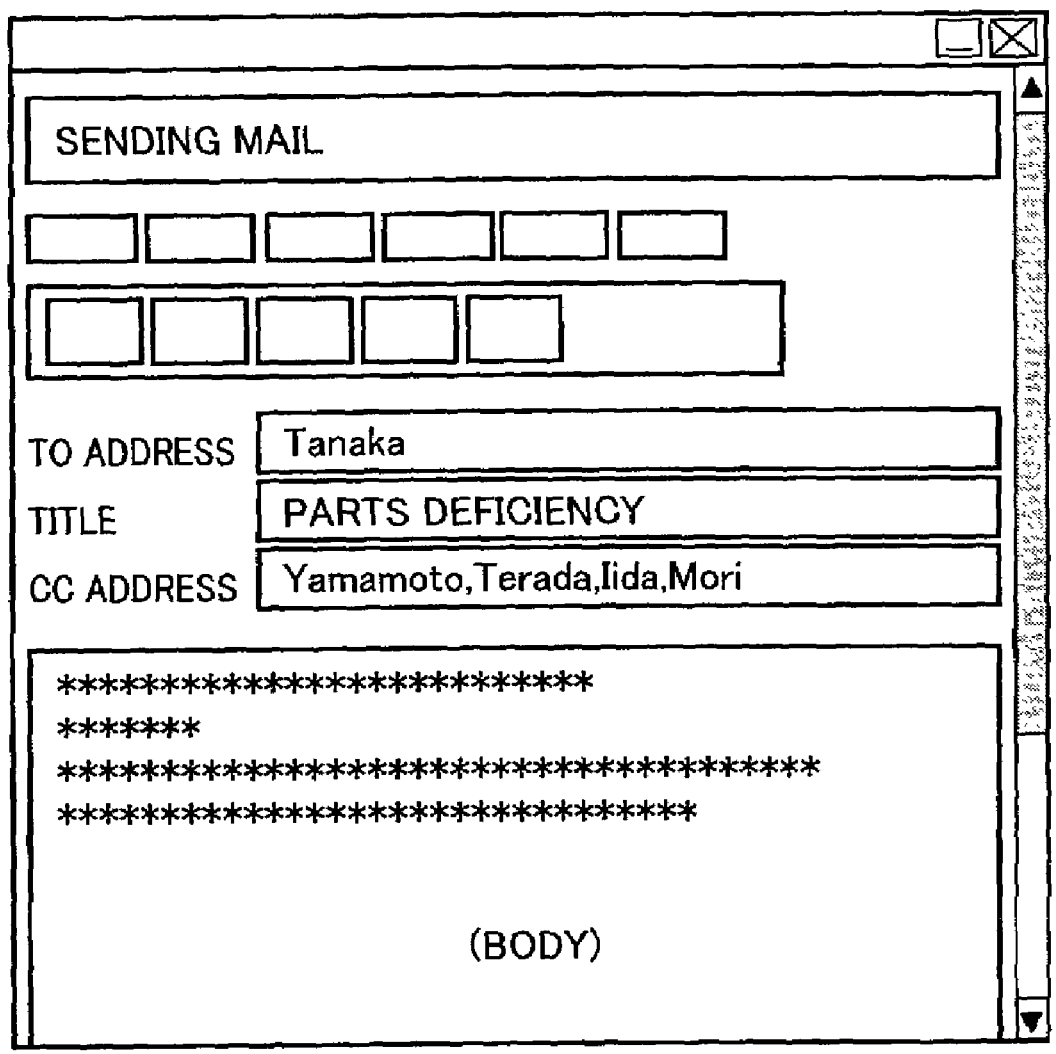
FIG. 7 shows a specific example of a mail according to the first embodiment.

The mail shown in FIG. 7 has a structure of a general electronic mail, including a TO address (Tanaka), a title (Parts deficiency) and CC addresses (Yamamoto, Terada, Iida and Mori) at the header portion, and information related to the body of the mail.

When mail server 100 receives the mail shown in FIG. 7, at step S71 in FIG. 5, it extracts, in CPU 11, the TO address (Tanaka) and CC addresses (Yamamoto, Terada, Iida, Mori) from the header portion.

Moreover, at step S72 in FIG. 5, the title (Parts deficiency) is extracted from the mail shown in FIG. 7 as title information.

Further, at step S73 in FIG. 5, date-of-receipt information of the mail, which is not shown in FIG. 7, is extracted at step S73 in FIG. 5.

Furthermore, at step S74 in FIG. 5, the body information, which is not specifically shown in FIG. 7, is extracted.

Based on the extracted information, mail server 100 creates Web data at step S75 in FIG. 5.

Figure 8:
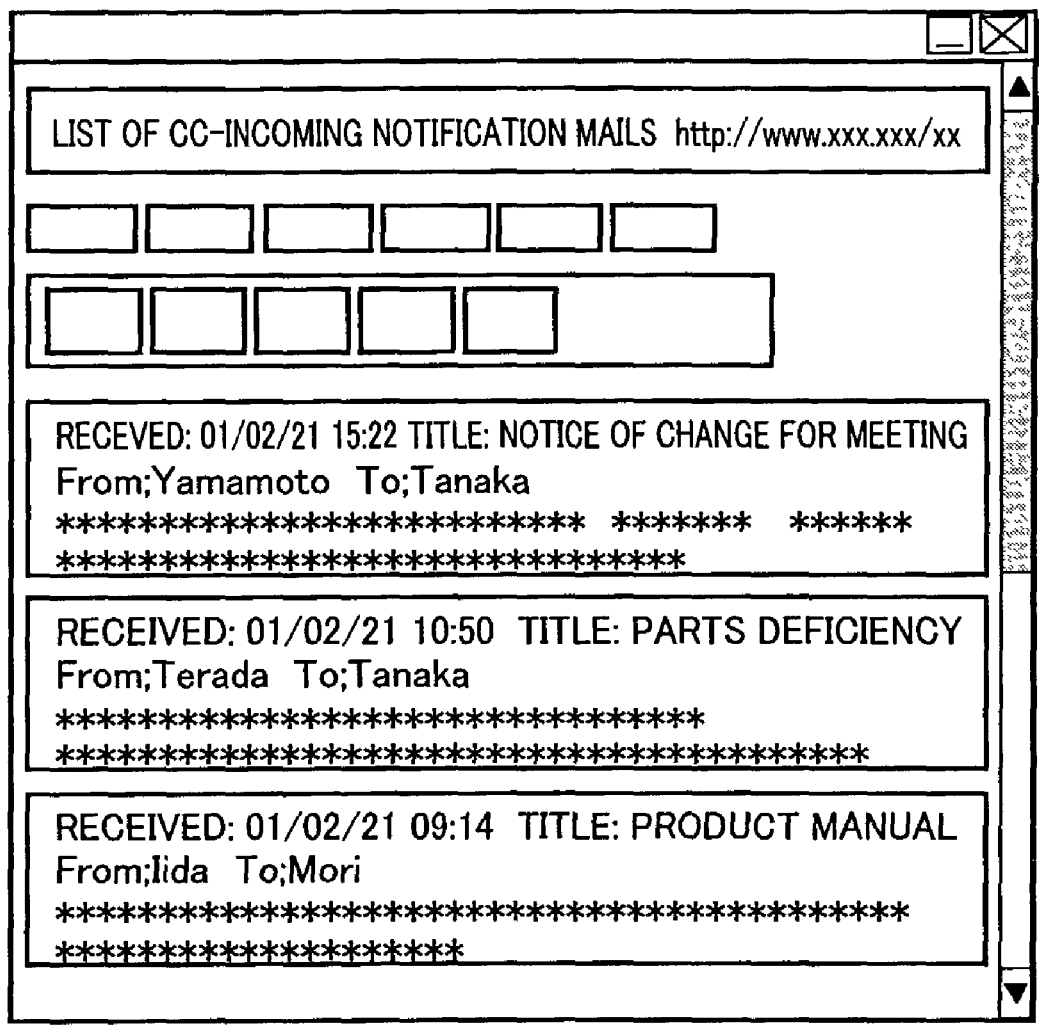
FIG. 8 shows an example of display of Web data on a Web browser in the first embodiment.

The Web data on an electronic bulletin board shown on a screen display in FIG. 8 is created after the user (Tanaka) designated by the TO address for the mail draws out the mail.

Referring to FIG. 8, the Web data created by the Web data creating process shown in FIG. 5 indicates, under the title of e.g. "list of CC-incoming notification mails," the title (Parts deficiency), date of receipt, destination addresses (Yamamoto, Terada, Iida, Mori) and body information that have been extracted from the mail. Moreover, the Web data created by the Web data creation process shown in FIG. 5 also indicates previously-received mails in order of recency. Upon reception of the CC-incoming notification mail, the user designated by the CC address or BCC address can view the "list of CC-incoming notification mails" shown in FIG. 8 on an electronic bulletin board on the Web.

Figure 6:
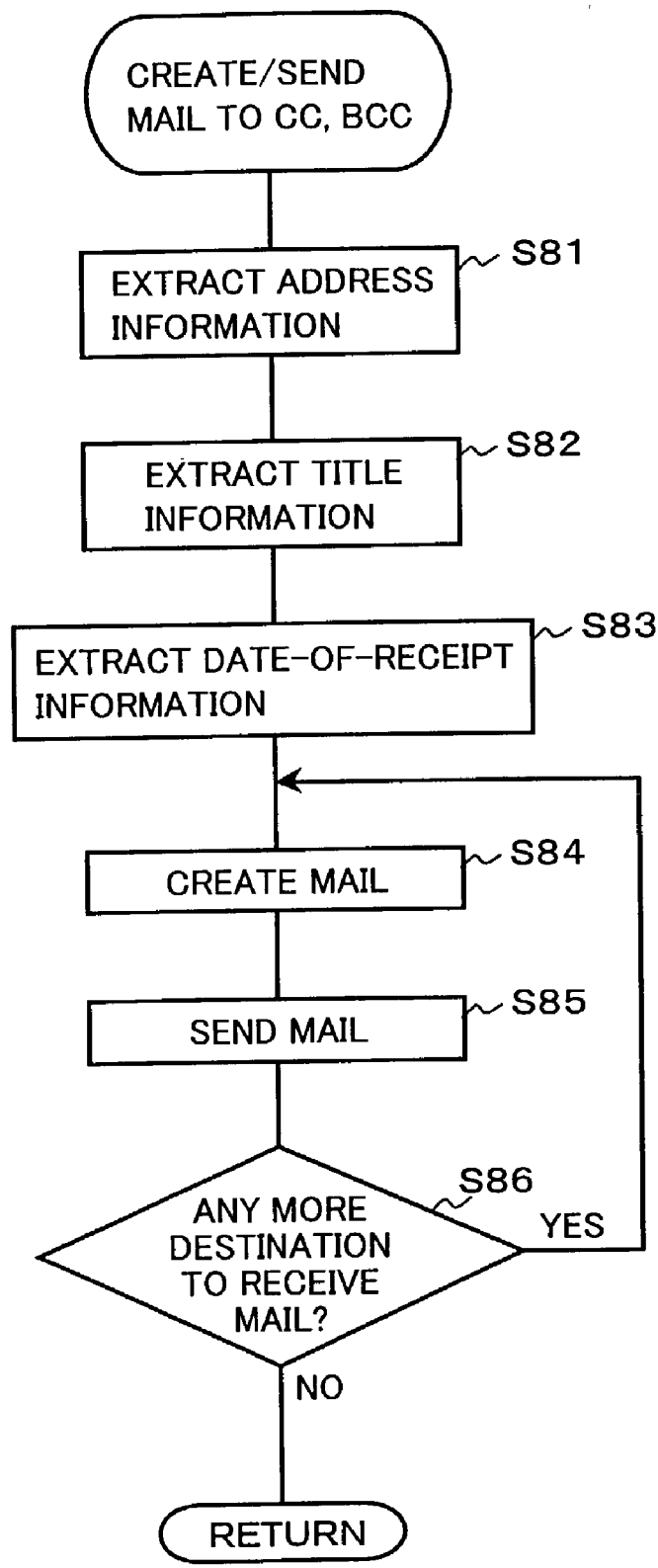
FIG. 6 is a flowchart illustrating a process of creating and sending a notice of incoming CC, performed at step S69 in FIG. 4.
Figure 9:
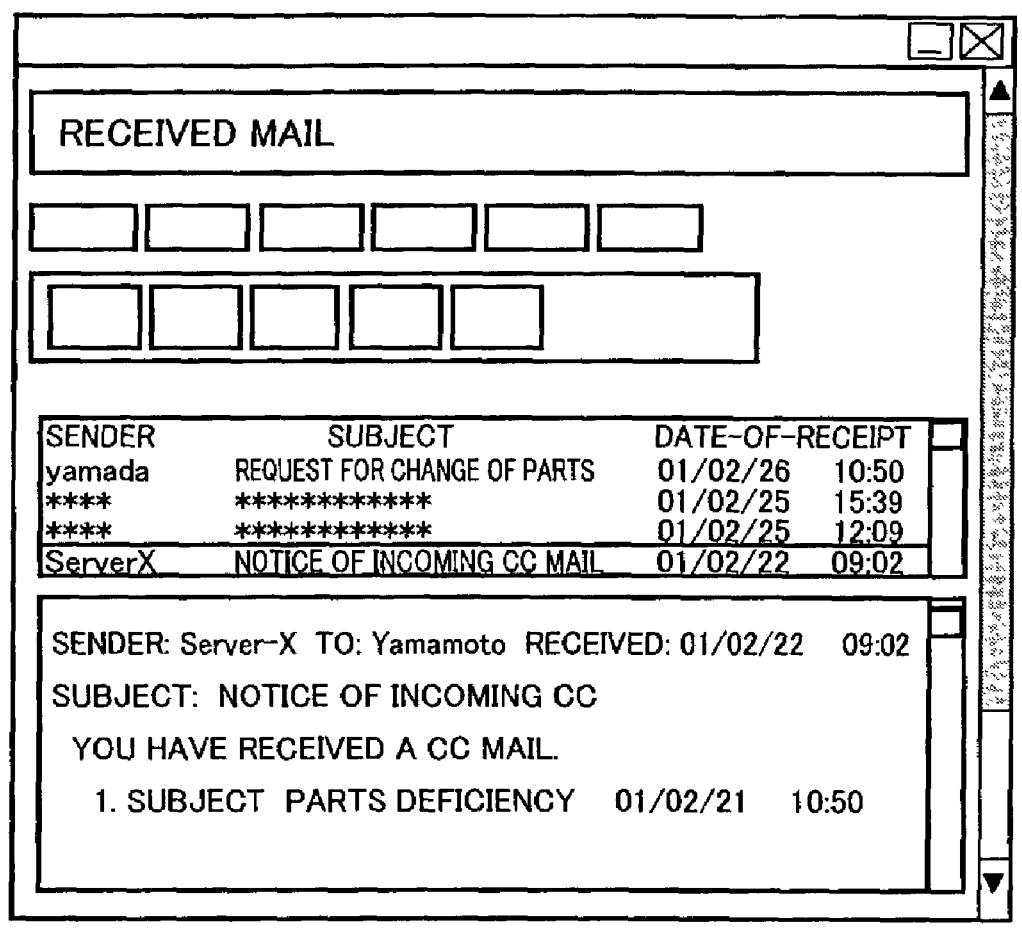
FIG. 9 shows an example of display on a client device 200 that received the notice of incoming CC.

Further, the CC-incoming notification mail shown in FIG. 9 is created and sent after the user (Tanaka) designated by the TO address for the mail draws out the mail, by the process shown in FIG. 6.

FIG. 9 shows a CC-incoming notification mail received by a user (Yamamoto) designated by a CC address from mail server 100 (Server-X). The body of the CC-incoming notification mail shown in FIG. 9 indicates the title (Parts deficiency) and the date of receipt (01/02/21, 10:50).

The mail system according to the present embodiment executing the above-described method of providing mail information allows the users to readily share an electronic mail on an electronic bulletin board, which had conventionally been shared by broadcasting. Thus, the number of electronic mails that had conventionally been broadcast in high volume can greatly be reduced.

Further, by the method of providing mail information executed by the mail system in the present embodiment, an electronic mail can be shared between the users designated by the CC address and BCC address after the user designated by the TO address for the electronic mail draws out the electronic mail from the server. This can prevent a problem of confused order of transmission that may occur when the user designated by the CC address or BCC address acquires the contents of the electronic mail prior to the user designated by the TO address acquiring the same and proceeds to work assuming that the user designated by the TO address had already known the contents.

Second Embodiment

A mail system according to the second embodiment has a configuration similar to that of the mail system in the first embodiment shown in FIG. 1, so that description thereof will not be repeated here.

Turning now to the flowchart in FIG. 10, the operation of mail server 100 in the mail system according to the second embodiment will be described in providing mail information. It is noted that this process is achieved by CPU 111 executing a program stored in ROM 113.

Figure 10:
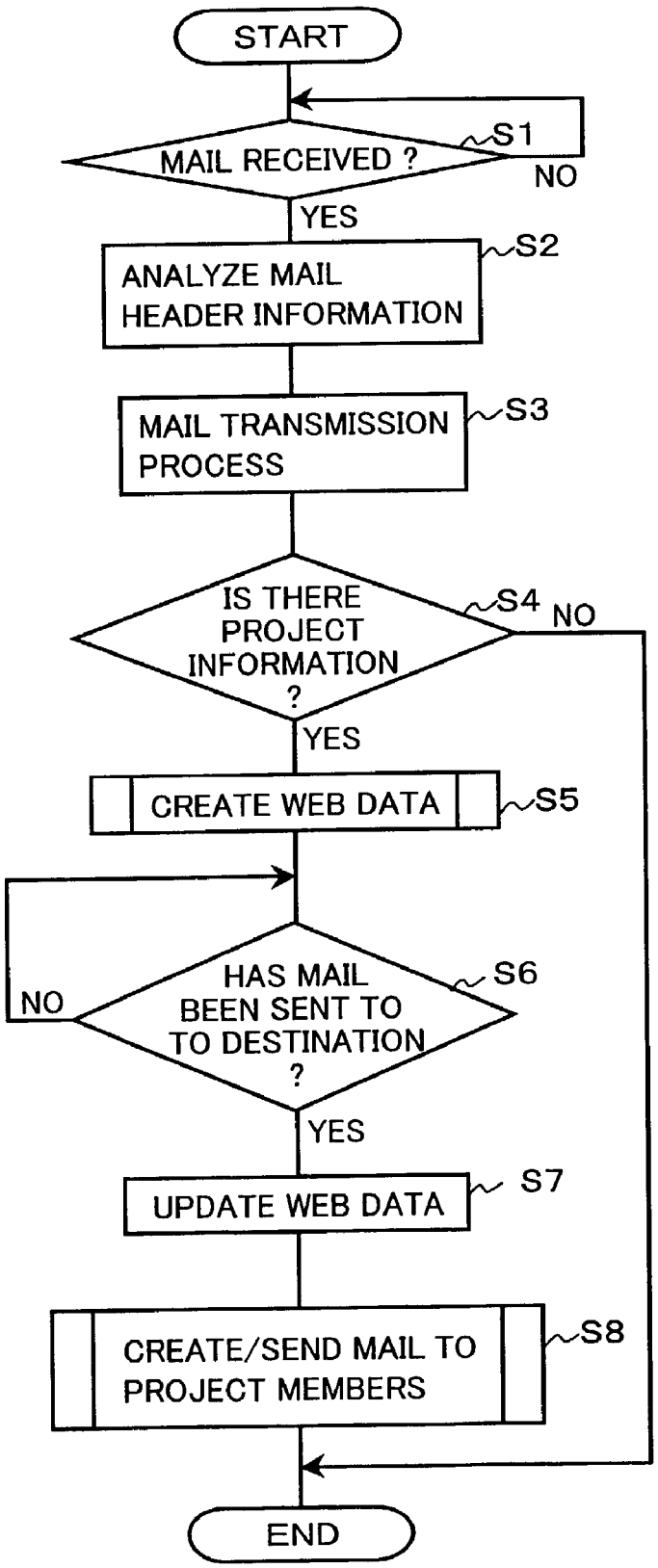
FIG. 10 is a flowchart illustrating a process for providing mail information, performed by mail server 100, in the second embodiment.

Referring to FIG. 10, when a mail is received (Yes at S1), CPU 111 of mail server 100 separates the body from the header portion of the mail and analyzes the header information at a data analysis portion (S2).

Mail server 100 then reads out information related to a TO address and to a project (hereinafter referred to as projection information) from the header portion separated at step S2. The project information will be described later in detail by providing a specific example.

Subsequently, mail server 100 stores the mail by associating it with the user designated by the TO address taken out from the header portion of the mail at step S2, and waits for the mail to be drawn out by the user designated by the TO address (S3).

If the header portion of the mail analyzed at step S2 includes no project information (No at S4), the normal mail transmission process is terminated.

If the header portion of the mail analyzed at step S2 includes project information (Yes at S4), mail server 100 creates Web data of the project (S5). Mail server 100 then registers the created Web data in a prescribed area (Web data storage portion) in HDD 115 of mail server 100. It is noted that the process of creating Web data performed at step S5 will be described later in detail in conjunction with a flowchart.

At this point, the Web data created at step S5 cannot be viewed on the Web, since the Web data is registered in a directory that allows no viewing.

Mail server 100 monitors whether or not the mail stored at step S3 is drawn out by the user designated by the TO address (S6). When the mail is drawn out (Yes at S6), mail server 100 transfers the Web data created at step S5 to a viewable directory. This updates the Web data (S7), which can now be viewed on the Web.

Further, mail server 100 creates a mail for notifying a project member that the Web data created based on a mail specifying a project, i.e. a mail including project information, has been registered in mail server 100 (hereinafter referred to as "notification mail"), and sends the created notification mail to the project member (S8).

It is noted that the process of creating and sending the notification mail at step S8 will be described later in detail in conjunction with a flowchart.

After the transmission process at S8, the process in mail server 100 for providing mail information is terminated.

Next, the process of creating the Web data performed at step S5 in FIG. 10 will be described with reference to the flowchart in FIG. 11.

Figure 11:
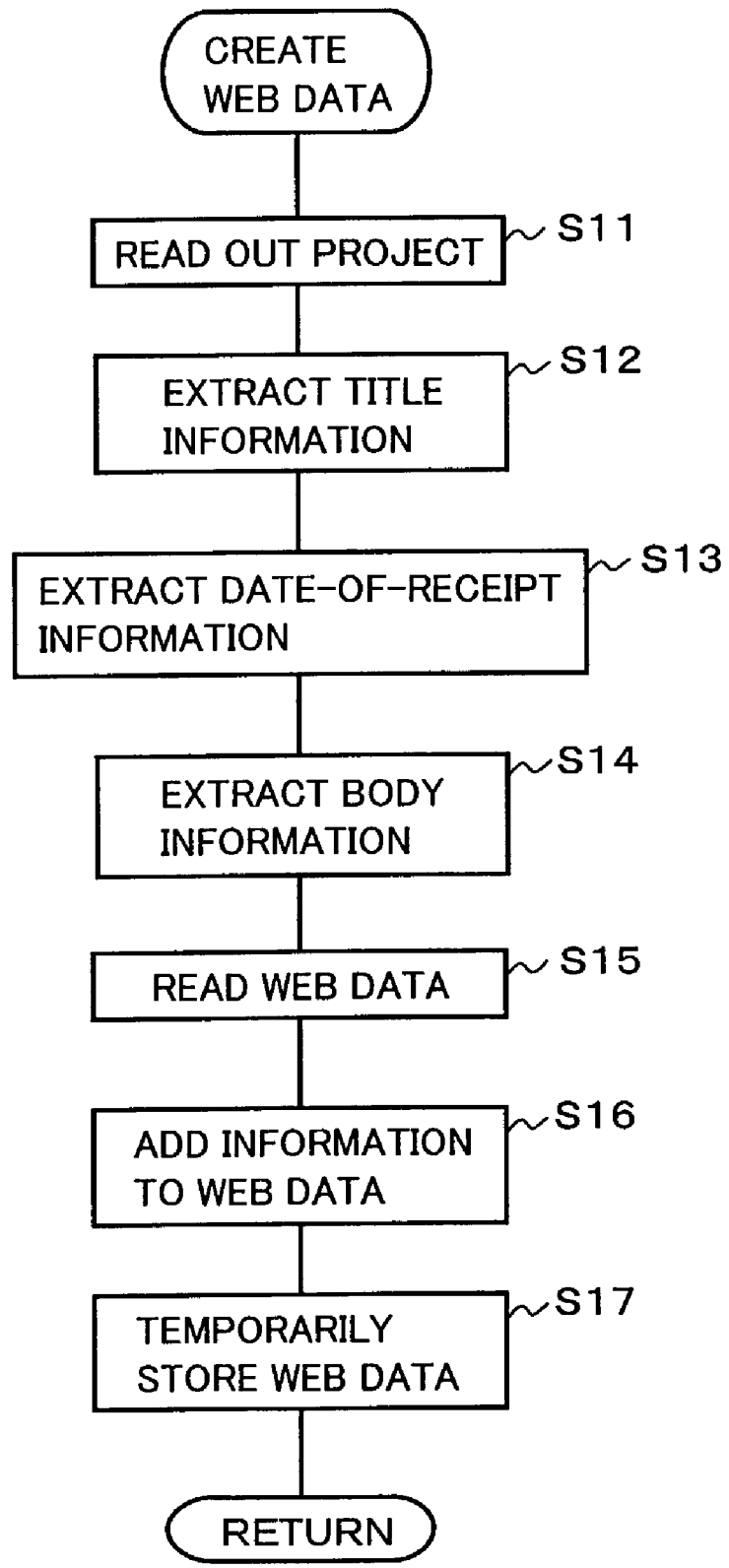
FIG. 11 is a flowchart illustrating a process of creating Web data, performed at step S5 in FIG. 10.

Referring to FIG. 11, mail server 100 reads out, in CPU 111, a project name from the header portion of the received mail (S11).

Subsequently, mail server 100 searches for a character string "Subject:" to extract the contents described under that item from the header portion of the mail as title information (S12).

Next, mail server 100 detects a character string "Received:" from the header portion of the mail to extract date-of-receipt information written in that item (S13).

Further, mail server 100 extracts body information of the mail in accordance with the contents of boundarystring and Content-Type (S14). Attached file information to the mail may, if any, be extracted as well in a similar manner.

Mail server 100 reads the Web data of the project from the prescribed area (Web data storage portion) in HDD 115 based on the project name read out at step S11 (S15), and adds the title, date-of-receipt and body information of the mail extracted at steps S12 to S14 above to the Web data read at step S15 (S16).

The Web data added at step S16 is temporarily saved in a prescribed area in HDD 115 that allows no viewing (S17).

This completes the process of creating the Web data.

The process of creating and sending a notification mail to a project member, performed at step S8 in FIG. 10, will be described with reference to the flowchart in FIG. 12.

Figure 12:
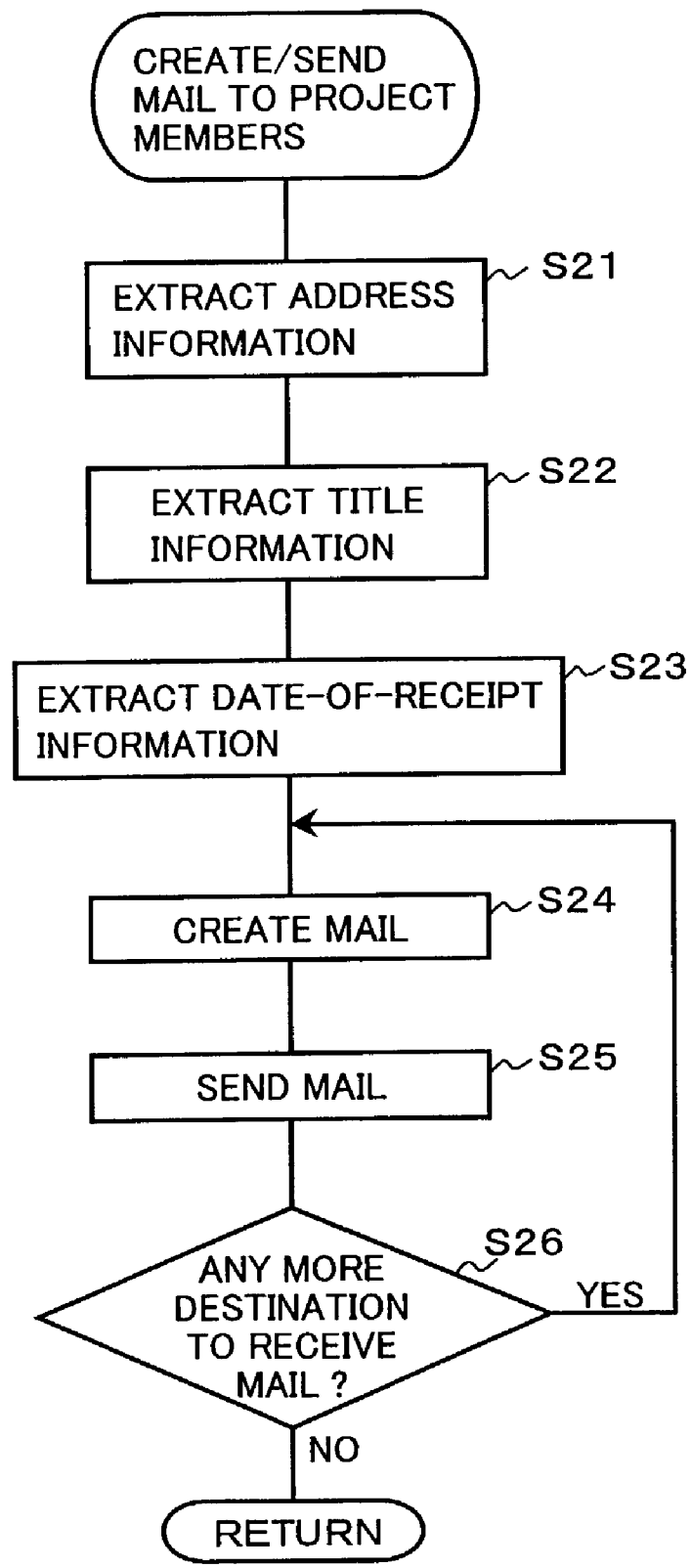
FIG. 12 is a flowchart illustrating a process of creating and sending a notification mail, performed at step S8 in FIG. 10.

Referring to FIG. 12, CPU 111 in mail server 100 reads out address information for the project member from a list of project members of the project based on the project name read out from the header portion of the received mail (S21). The project member list will be described later in detail with a specific example.

Subsequently, mail server 100 extracts title information and date-of-receipt information from the received mail (S22, S23). The extraction process at steps S22 and S23 is similar to that at steps S12 and S13 in FIG. 11, so that detailed description thereof will not be repeated here.

After the process of extracting each information is terminated, mail server 100 subsequently creates a notification mail to a project member of interest (S24). That is, mail server 100 creates a notification mail including one of address information of the project members read out at step S21 as a TO address with an addition of the title "notice of incoming project mail." The title information and date-of-receipt information extracted at steps S22 and S23 are added to the body of the notification mail.

After thus creating the notification mail, mail server 100 sends the created notification mail to the user designated by the TO address (S25). Mail server 100 then repeats the mail creation process (step S24) and mail transmission process (step S25) in order to send the notification mail to the addresses of all the read project members until there is no more address to receive the mail (S26). After sending the notification mail to all the read project members (No at step S26), mail server 100 terminates the process of creating and sending the notification mail.

By receiving the notification mail created by the process above that notifies the project member of an incoming mail specifying a project, the project member can find out that the mail sent for the project is posted on an electronic bulletin board for the project.

The process for providing mail information will be described below in detail by providing a specific example.

Figures 13, 14:
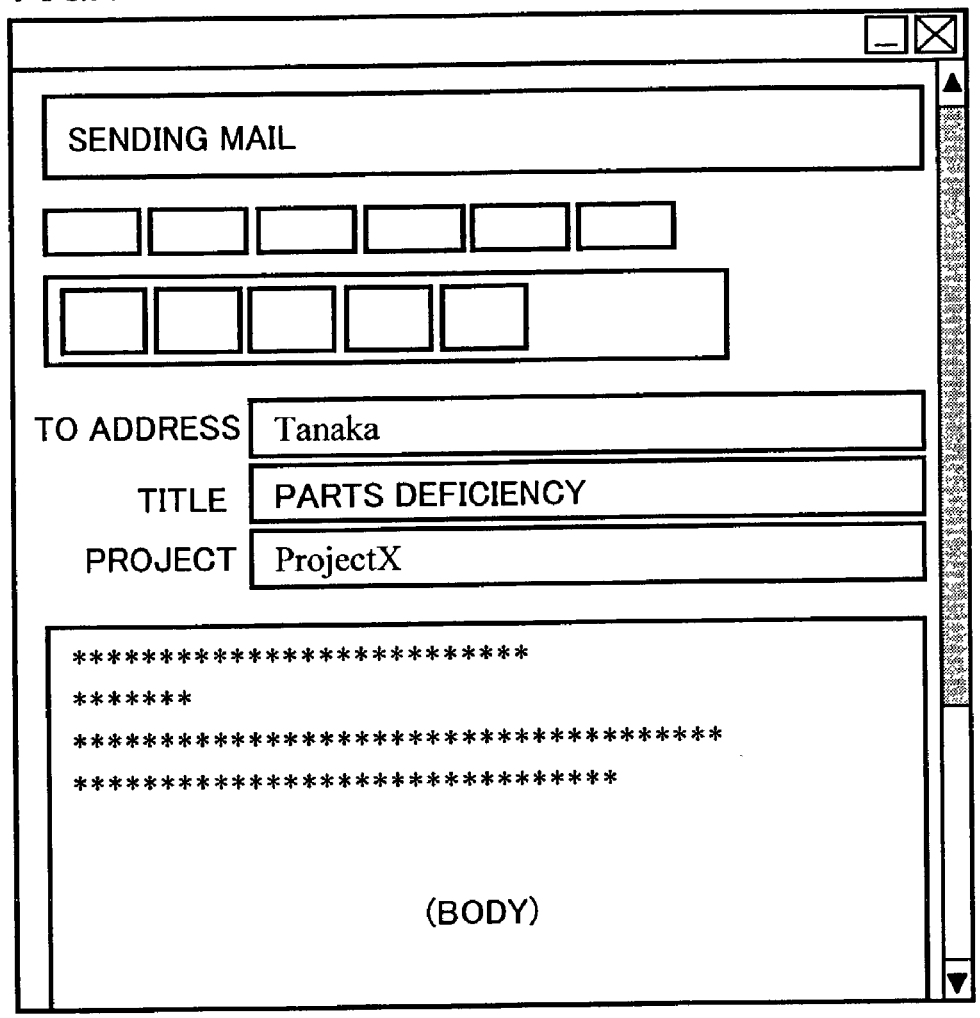
FIG. 13 shows a specific example of a mail according to the second embodiment.
FIG. 14 shows a specific example of a project list.

Referring to FIG. 13, a mail in which a project is specified according to the present embodiment includes a TO address (Tanaka), a title (Parts deficiency) and a project name (ProjectX) at the header portion, and information related to the mail body.

The user enters information in each column shown in FIG. 13 via input portion 203 of client device 200 and transmits the mail.

Mail server 100 that received the mail shown in FIG. 13 analyzes the header portion at step S2 in FIG. 10.

Further, at step S3 in FIG. 10, mail server 100 performs a process for sending the mail to a destination designated by the analyzed TO address (Tanaka).

Moreover, if the header portion of the mail includes project information, mail server 100 creates the Web data shown in FIG. 11. At steps S11 to S14 in FIG. 11, mail server 100 extracts project name (ProjectX), title information (Parts deficiency) and date-of-receipt information from the header portion of the mail shown in FIG. 13 and body information.

In addition, at step S15 in FIG. 11, mail server 100 obtains data of the project (ProjectX) from a project list based on the extracted project name (ProjectX), and reads out the Web data of the corresponding project (ProjectX) from HDD 115.

The project list shown in FIG. 14 is stored in a prescribed area of HDD 115 of mail server 100. FIG. 14 shows a project list for a project (ProjectX).

Referring to FIG. 14, the project list indicates information related to the project. Specifically, the project list includes information identifying the project (ProjectX) such as a project name, a project number and an address of an electronic bulletin board for each project. It is noted that the project here means a group consisting of specific members who share the electronic bulletin board administrated by mail server 100.

At step S15 in FIG. 11, mail server 100 obtains the address of the electronic bulletin board for the project (ProjectX) from the project list shown in FIG. 14, based on the project name (ProjectX) read out at step S11 in FIG. 11.

Mail server 100 reads the Web data for the project (ProjectX) from the prescribed area of HDD 115, based on the obtained address of the electronic bulletin board for the project (ProjectX).

Figure 15:
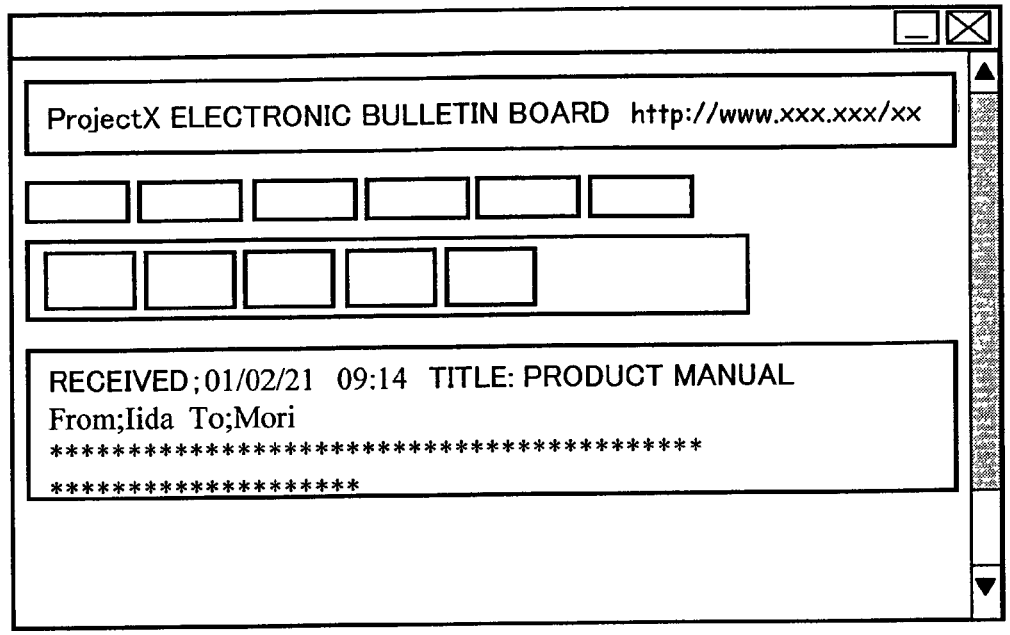
FIG. 15 shows a specific example of an electronic bulletin board for a project (ProjectX) in the second embodiment.

The electronic bulletin board shown in FIG. 15 is the one before the mail shown in FIG. 13 is posted up, and shows a mail for providing mail information prior to that time point (title: product manual).

Referring to FIG. 15, the electronic bulletin board includes the title, date-of-receipt and body of the mail that can be viewed by project members constituting the project (ProjectX).

The Web data of the project (ProjectX) stored in the prescribed area of HDD 115 is information expressed in the HTML format, indicating the electronic bulletin board for the project (ProjectX) shown in FIG. 15, a specific example of which is not shown here.

At step S16 in FIG. 11, mail server 100 additionally writes the title, date-of-receipt and body in the HTML format into the Web data of the project (ProjectX) read out at step S15 in FIG. 11, such that the title, date-of-receipt and body of the mail shown in FIG. 13 is additionally posted up on the electronic bulletin board for the project (ProjectX). The Web data with the addition is temporarily saved in a prescribed area of HDD 115 at step S17 in FIG. 11.

The project member (Tanaka) designated by the TO address that received the mail shown in FIG. 13 instructs via input portion 203 or the like of client device 200, at reception of the mail, to draw out the mail from mail server 100. When the mail is drawn out by the project member (Tanaka) designated by the TO address at step S6 in FIG. 10, mail server 100 replaces, at step S7, the Web data before updating with the Web data for the project (ProjectX) that was created and temporarily saved at step S5 (updated Web data). Replacement of the old Web data with the updated Web data allows the electronic bulletin board for the project (ProjectX) shown in FIG. 15 to be updated to a new electronic bulletin board on which the mail shown in FIG. 13 is posted.

Figure 16:
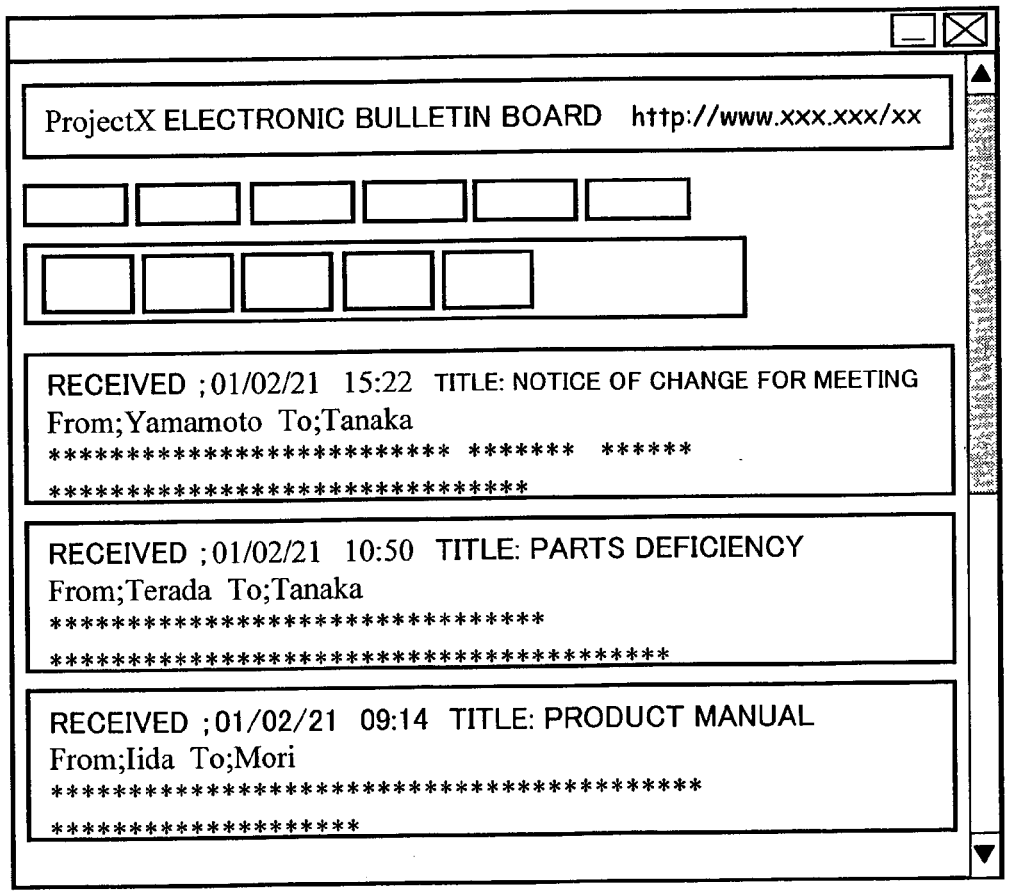
FIG. 16 shows a specific example of an electronic bulletin board for a project (ProjectX) updated by the process of providing mail information.

Referring to FIG. 16 showing a specific example of the electronic bulletin board for the project (ProjectX) that was updated by the process of providing mail information, the replacement process at step S7 in FIG. 10 allows the mail shown in FIG. 13 (title: Parts deficiency) received at step S1 in FIG. 10 and the like to be added to the old electronic bulletin board shown in FIG. 15 to be posted up on the electronic bulletin board for the project (ProjectX).

Moreover, the mail added to the electronic bulletin board shown in FIG. 16 is posted up after the project member (Tanaka) designated by the TO address draws out the mail from mail server 100 at step S6 in FIG. 10. Further, in case of mail server 100 having a function of confirming a mail being opened, the process at step S7 in FIG. 10 is performed after confirming that the project member (Tanaka) has opened the mail, such that the mail is posted up after the mail is opened by the project member (Tanaka).

Furthermore, at step S8 in FIG. 10, mail server 100 creates a notification mail for notifying project members constituting the project (ProjectX) that the electronic bulletin board for the project (ProjectX) shown in FIG. 15 has been updated as shown in FIG. 16, and sends the created notification mail.

At step S21 in FIG. 12, CPU 111 of mail server 100 extracts information on the project members constituting the project (ProjectX) from the project member list.

Figures 17, 18:
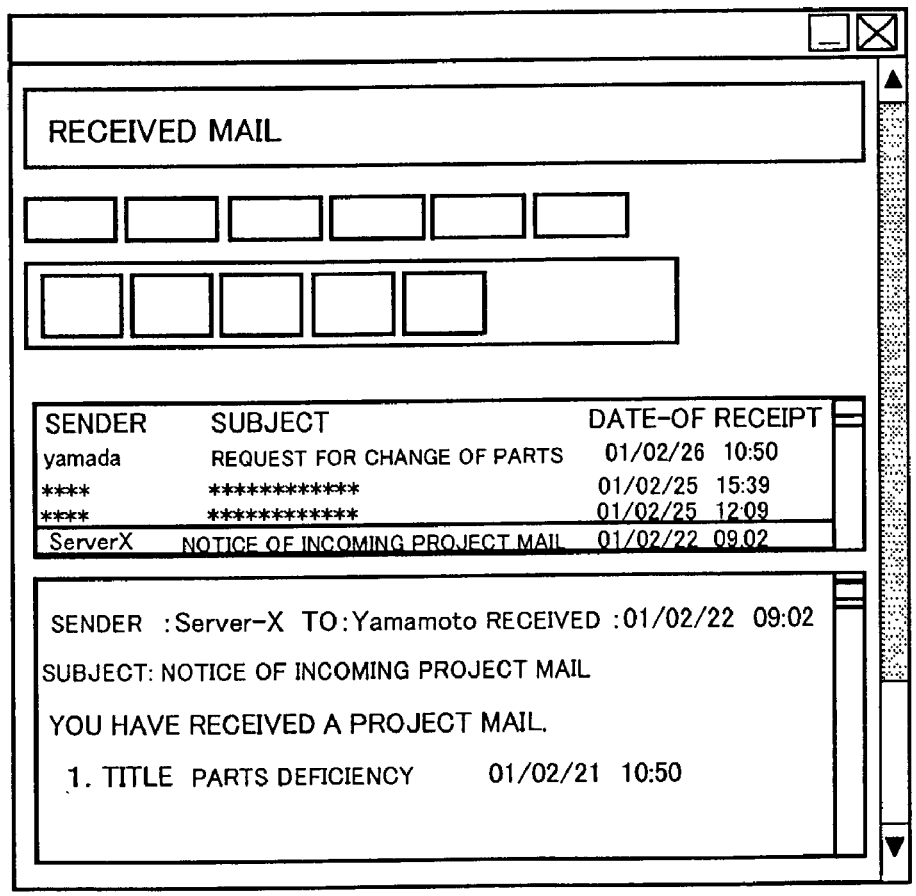
FIG. 17 shows a specific example of a project member list.
FIG. 18 shows an example of display on client device 200, showing a mail for notifying a project member that the electronic bulletin board has been updated.

The project member list shown in FIG. 17 is stored in a prescribed area of HDD 115 of mail server 100. FIG. 17 shows a project member list for the project members constituting the project (ProjectX).

Referring to FIG. 17, the project member list includes a member name, a member ID, a mail address and a password for each of the project members constituting the project (ProjectX). Moreover, besides the information above, information for identifying each project member who belongs to the project (ProjectX) may also be indicated.

At step S21 in FIG. 12, CPU 111 of mail server 100 extracts a mail address of a project member who belongs to the project (ProjectX) from the project member list for the project (ProjectX) shown in FIG. 17.

Further, mail server 100 creates a notification mail to a project member of the project (ProjectX) at step S24 in FIG. 12, based on the title information and date-of-receipt information of the mail that were extracted at steps S22 and S23 in FIG. 12.

The project member who received the notification mail shown in FIG. 18 finds out that a mail to which the project name is added (a project mail) is newly posted on the electronic bulletin board.

Referring to FIG. 18, the notification mail indicates the title information and date-of-receipt information for the project mail received at step S1 in FIG. 10.

In the notification mail shown in FIG. 18, information for accessing registered body information may be added e.g. to the title, which enables a project member to view the electronic bulletin board shown in FIG. 16 by clicking.

The project member who received the notification mail shown in FIG. 18 can view the electronic bulletin board for the project (ProjectX) shown in FIG. 16 by performing a process for viewing the mail, which will be described below.

The process for viewing mail information will be described with reference to the flowchart in FIG. 19. The process shown in FIG. 19 performed in server 100 allows a project member to view the electronic bulletin board on client device 200.

Figure 19:
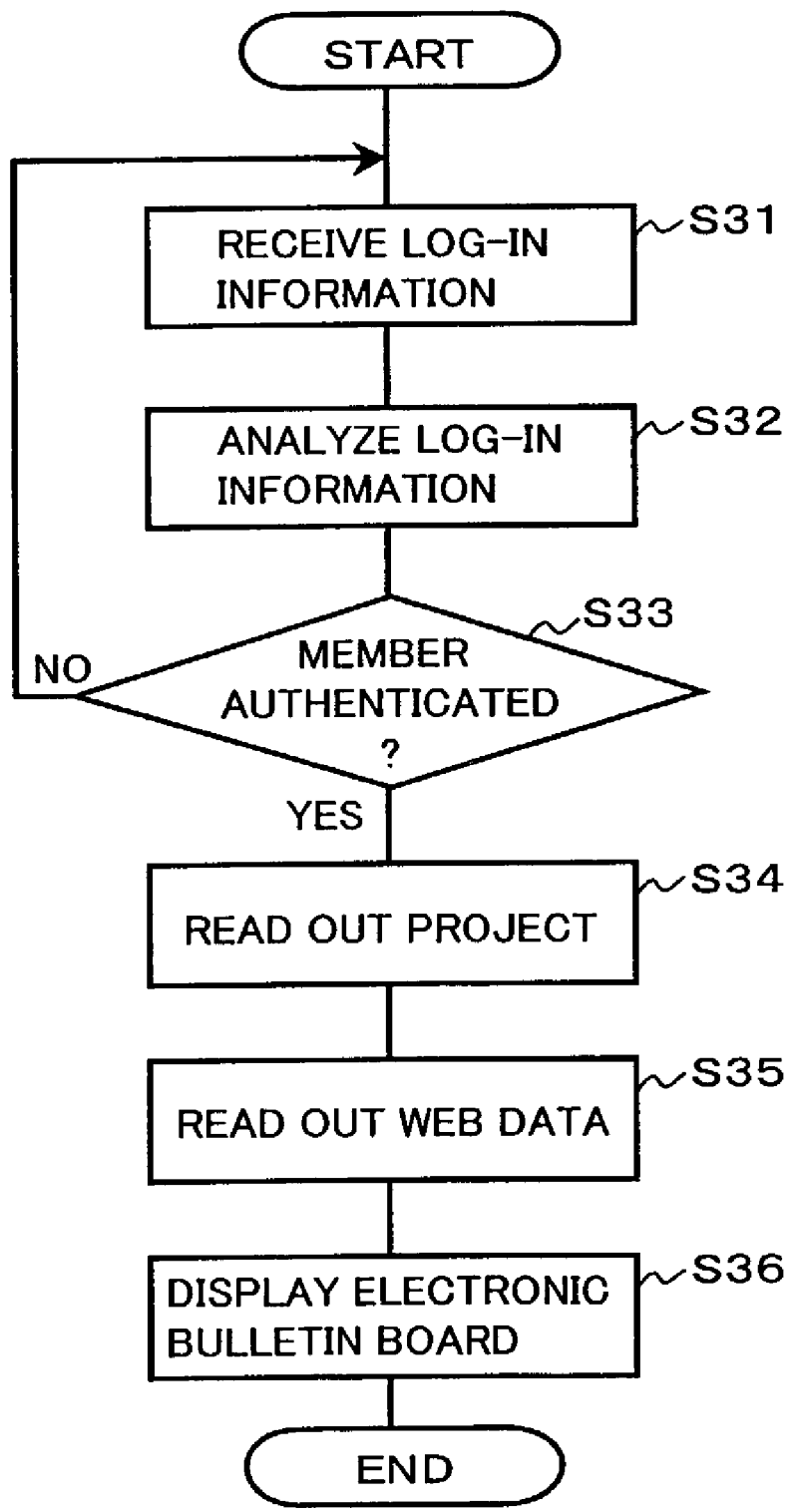
FIG. 19 is a flow chart illustrating a process for viewing mail information provided by the process of providing mail information shown in FIG. 10.

Referring to FIG. 19, mail server 100 receives log-in information via network 300 from client device 200 of a project member (S31).

The project member accesses a log-in screen on client device 200 in order to send the log-in information to mail server 100. The project member enters the log-in information via input portion 203 or the like by following the log-in screen displayed on display portion 204 of client device 200.

Mail server 100 analyzes the log-in information received at step S31 (S32).

Subsequently, mail server 100 performs an authentication process for the project member, based on the log-in information analyzed at step S32 (S33).

If the project member is authenticated based on the received information (Yes at S33), CPU 111 of mail server 100 reads out the project from the project member list (S34). At step S34, CPU 111 reads out, from the project member list, the project to which the project member belongs, based on an ID for the authenticated project member. CPU 111 further reads out information for identifying the project from the project list, based on the read-out project.

CPU 111 of mail server 100 subsequently reads out the Web data for the project from HDD 115 (S35). The electronic bulletin board for the project based on the Web data read at step S35 is displayed on display portion 204 of client device 200 (S36).

The viewing process performed in server 100 allows the project member to view the electronic bulletin board for the project.

Another specific example is provided below for detailed description of the viewing process shown in FIG. 19. In the specific example below, project members constituting a project (ProjectX) view the electronic bulletin board for the project (ProjectX).

When a project member who is to view the electronic bulletin board for the project (ProjectX) to which he/she belongs enters a pre-assigned address into the browser via input portion 203 of client device 200 for viewing the electronic bulletin board for the project (ProjectX), a log-in screen, which is not shown here, is displayed on display portion 204. The assigned address may be an address common to all project members for displaying the log-in screen, or an address assigned to each member of the project (ProjectX) for viewing the electronic bulletin board. The project member enters a password and a member ID that is pre-assigned to each project member, by following the displayed log-in screen.

At step S33 in FIG. 19, in mail server 100, the password and member ID are authenticated.

At step S33 in FIG. 19, mail server 100 checks the password and member ID with the project member list shown in FIG. 17 to authenticate the user as a project member of the project (ProjectX). Though both the password and member ID are used above, only one of these may be used in the authentication process.

When mail server 100 authenticates that the user is a project member of the project (ProjectX) at step S33 in FIG. 19, it reads out, at step S34, information for identifying the project (ProjectX) from the project list shown in FIG. 14.

At step S35, mail server 100 further reads out, from HDD 115, Web data on the electronic bulletin board for the project (ProjectX). Thus, at step S36, the electronic bulletin board for the project (ProjectX) shown in FIG. 16 is displayed on display portion 204 of client device 200.

As such, addition of the function of the electronic bulletin board to the conventional mail system allows sharing of an electronic mail on the electronic bulletin board, which had conventionally been shared by broadcasting. Sharing of the electronic mail enables a person in charge to remember important mails to be dealt with.

Further, by sharing electronic mails on an electronic bulletin board, the number of electronic e-mails that had conventionally been sent in a large amount by broadcasting can greatly be reduced. This can avoid a large number of mails burying an important mail, so that such an important mail can be prevented from being forgotten or dropped behind.

Moreover, the reduced number of mail transmissions can significantly lighten the load on the network server. This also leads to reduced load on the hard disk in each client device.

Furthermore, members who belong to the project can grasp the movement of other project members or the entire project at a glance by viewing the electronic bulletin board.

In addition, the process described above allows an electronic e-mail to be shared within the project after a project member designated by the TO address for the mail has received or opened the mail. This can prevent a problem caused by confusion in the order of communication that may occur when a project member designated by a CC address or BCC address acquires the contents of the mail prior to the project member designated by the TO address acquiring the same and proceeds to work assuming that the project member designated by the TO address have already known the contents.

Though, in the second embodiment, the TO address is an address of client device 200 within the network to which server 100 belongs, the TO address may be an address of client device 200 within a network other than the network to which server 100 belongs. In such a case, a process similar to that in the first embodiment may be performed. That is, a request for a delivery report or disposition notification may be added to the header portion of a mail to the TO address, and server 100 may determine, at step S6, that the mail is sent to a destination designated by the TO address in response to reception of a distribution-confirming mail from the mail server in the network to which the TO address belongs or an opening-confirming mail from the destination designated by the TO address.

Third Embodiment

The third embodiment is now described in which the above-mentioned method of providing mail information is applied to a digital copying machine.

Figure 20:
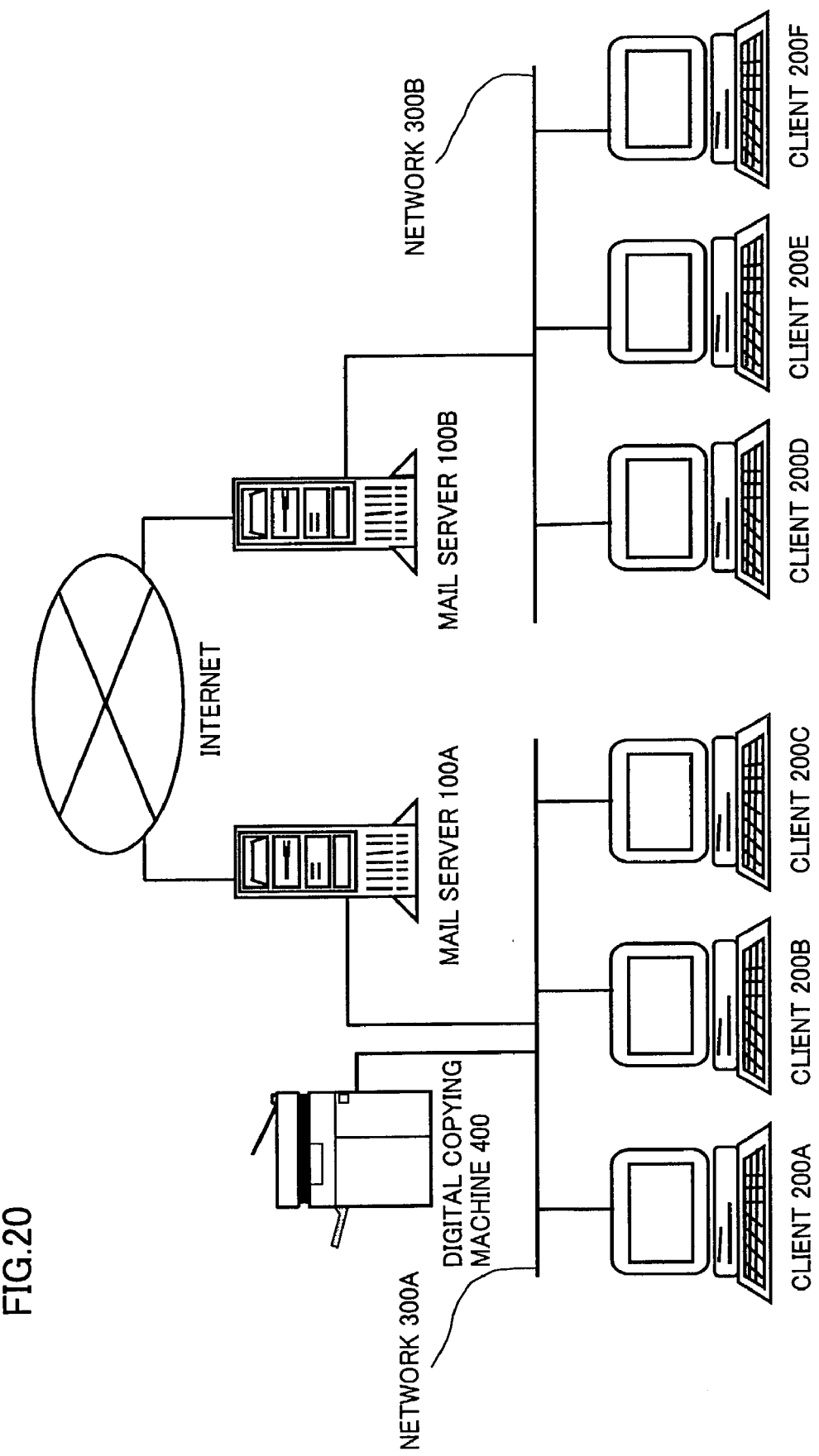
FIG. 20 shows a configuration of a mail information providing system according to the third embodiment.

Referring to FIG. 20, a mail information providing system according to the third embodiment includes, in addition to the configuration of the mail system in the first embodiment shown in FIG. 1, a digital copying machine 400.

Figure 21:
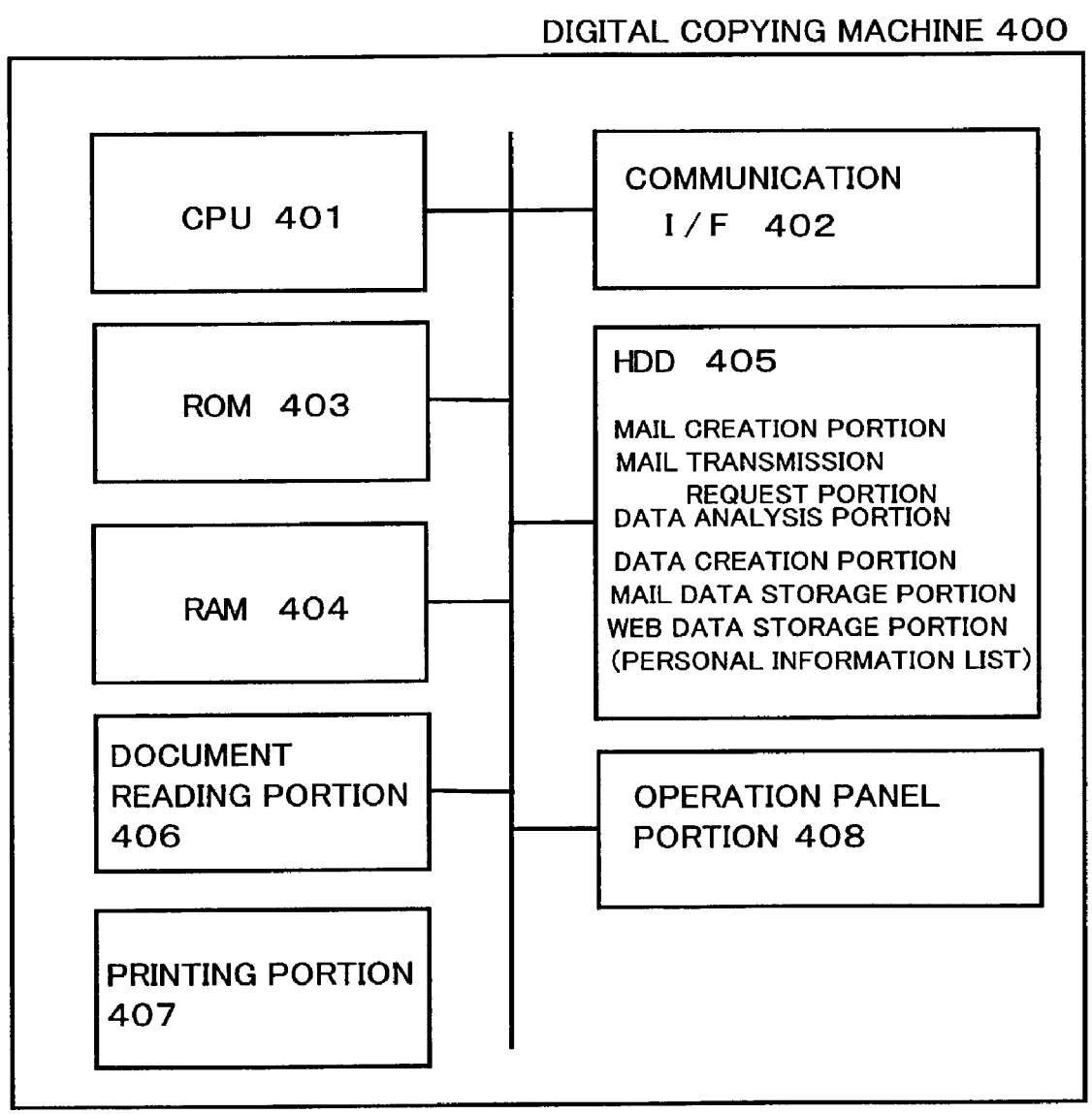
FIG. 21 is a block diagram showing a configuration of a digital copying machine 400 shown in FIG. 20.

Referring to FIG. 21, digital copying machine 400 includes a CPU 401, a ROM 403, a RAM 404, a communication I/F 402, an HDD 405, a document reading portion 406, a printing portion 407 and an operation panel portion 408.

CPU 401 controls the entire digital copying machine 400.

ROM 403 is a non-volatile storage device, which stores a program executed by CPU 401.

RAM 404 is a rewritable recording device, which is used for a work area required for CPU 401 executing the process.

Document reading portion 406 reads an original image to be copied, using an image-pick up device such as a CCD (Charge Coupled Device).

Printing portion 407 performs printing based on image data of the read original document or the like.

The user manipulates operating panel portion 408 to instruct the machine to perform action such as reading, copying, communication and the like.

Communication I/F 402 is an interface for communication with the outside, through which digital copying machine 400 communicates with other machines such as client device 200 via network 300 or the Internet.

HDD 405 is a large capacity storage device, which stores an application software such as a mail information providing program, other data and the like. At a prescribed area in HDD 405, a mail data storage portion storing mail data and a Web data storage portion storing Web data and personal information are provided. It is noted that the mail information providing program stored in HDD 405 includes, as software components, a mail creation portion creating a mail, a mail transmission request portion issuing a request for mail transmission, a data analysis portion analyzing address information and a data creation portion creating Web data and the like.

Next, the process for providing mail information performed by digital copying machine 400 shown in FIG. 21 will be described with reference to the flow chart in FIG. 22. It is noted that the process for providing mail information illustrated in FIG. 22 is achieved by CPU 401 of digital copying machine 400 executing a program stored in ROM 403.

Figure 22:
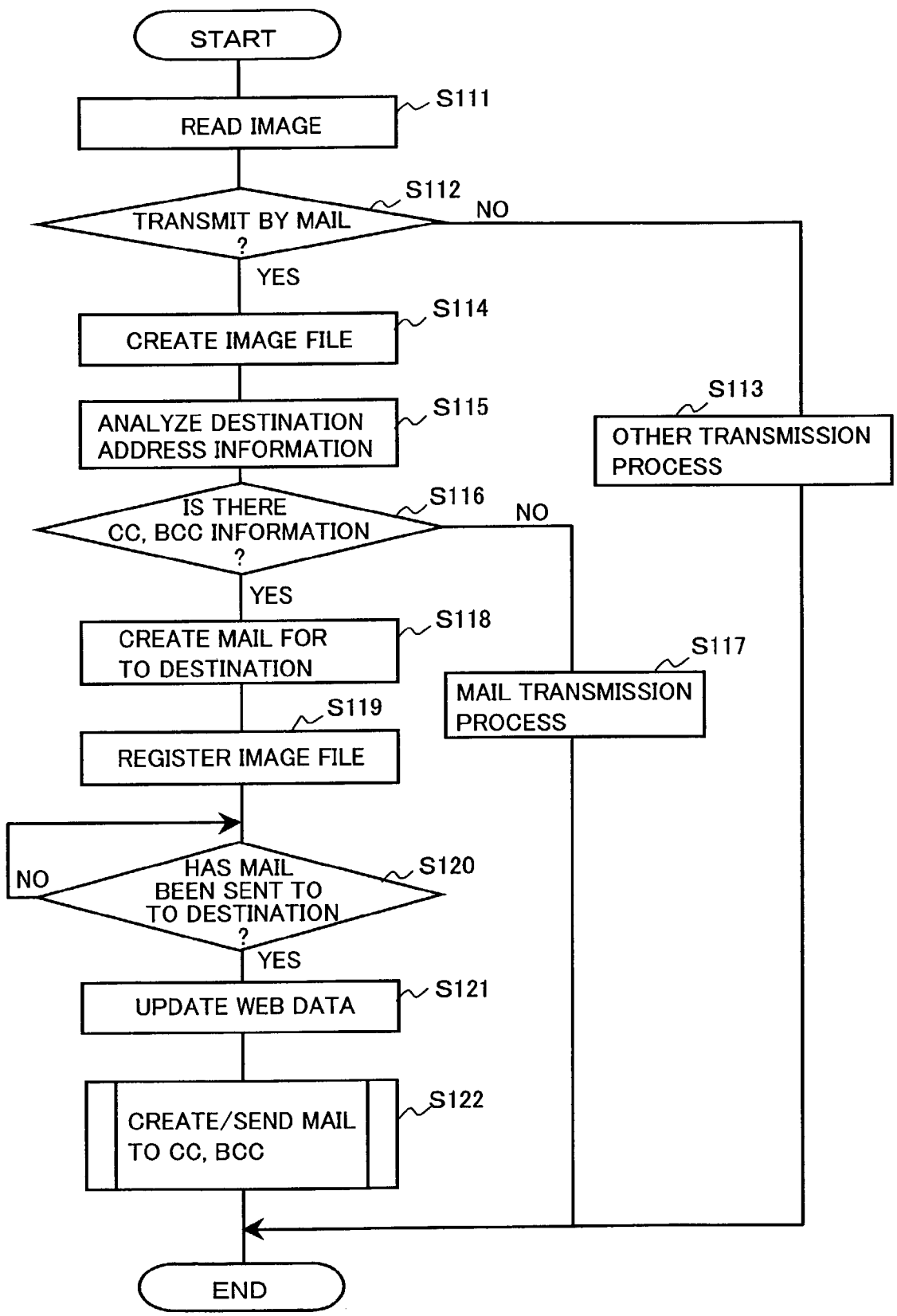
FIG. 22 is a flow chart illustrating a process for providing mail information, in digital copying machine 400 according to the third embodiment.

Referring to FIG. 22, document reading portion 406 of digital copying machine 400 reads an image of an original document (S111).

If the image data read at step S111 is not transmitted by a mail (No at S112), digital copying machine 400 transmits the image data by another method (S113). The transmission process for the image data here will not be described in detail.

If, on the other hand, the image data read at step S111 is transmitted by a mail (Yes at S112), digital copying machine 400 creates an electronic file of the image read at step S111 (S114).

Digital copying machine 400 then analyzes destination address information that is to receive the image data (S115), to determine whether or not there is a CC address or BCC address.

If there is no CC address or BCC address (No at S116), digital copying machine 400 performs a normal mail transmission process to the destination designated by a TO address (S117).

If, on the other hand, there is a CC address or BCC address (Yes at S116), digital copying machine 400 creates and sends a mail to the user designated by the TO address (S118). That is, digital copying machine 400 deletes the CC address or BCC address described therein, and rewrites the header portion such that the mail is sent only to the user designated by the TO address. Digital copying machine 400 then stores the mail by associating it with the destination designated by the TO address, and waits for the user designated by the TO address drawing out the mail. It is noted that the process of creating a mail at step S118 is similar to that shown at step S65 in FIG. 4, so that detailed description thereof will not be repeated here.

Next, digital copying machine 400 registers the image file created at step S114 in a prescribed area (Web data storage portion) of HDD 405 as Web data (S119). At this time point, the Web data registered at step S119 cannot be viewed on the Web, since it is registered in a directory that allows no viewing.

Digital copying machine 400 monitors whether or not the mail stored at step S118 is drawn out by the user designated by the TO address (S120). If it is drawn out (Yes at S120), digital copying machine 400 transfers the Web data registered at step S119 to a directory that allows viewing. This updates the Web data (S121), enabling the data to be viewed on the Web.

When the update of the Web data is terminated at step S121, digital copying machine 400 creates a mail for notifying the user designated by a CC address or a BCC address that the image data which is the Web data is registered (CC-incoming notice), and sends the created mail (S122).

Figure 23:
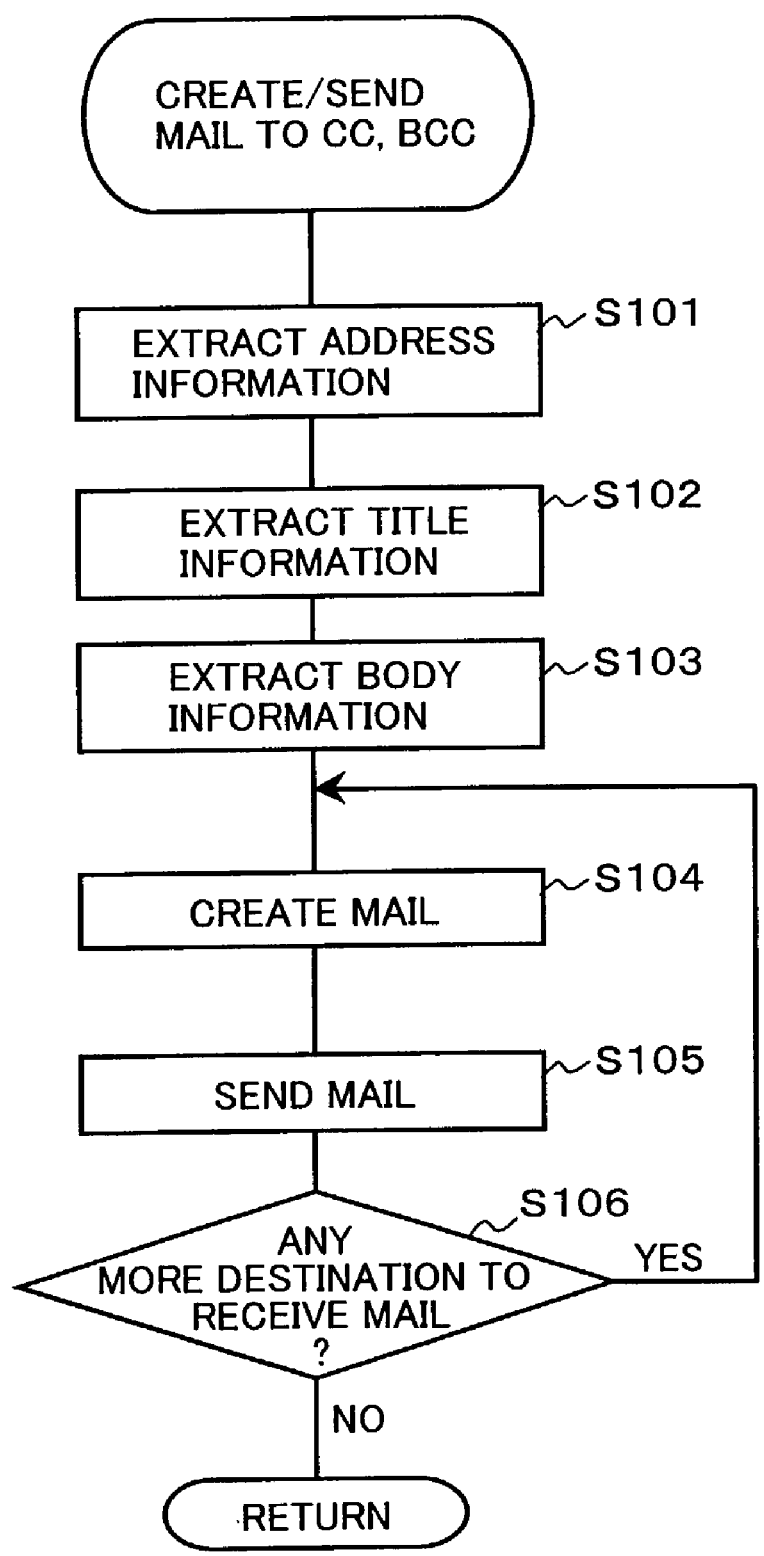
FIG. 23 is a flow chart illustrating a process of creating and sending a mail to CC and BCC destinations, performed at step S92 in FIG. 22.

Referring now to FIG. 23, digital copying machine 400 extracts CC address and BCC address information from information on a destination address that is to receive the image data read at step S111 in FIG. 22 (S101). Digital copying machine 400 also extracts body information including title information of the mail created at step S118 and image data information (S102, S103).

When the extraction process for each information is terminated, digital copying machine 400 subsequently creates a mail for the user designated by the CC address and BCC address (S104). That is, one of CC address information and BCC address information of the extracted destination address information is written as a TO address for the electronic mail. A title (subject) of "Notice of incoming CC" is added, and the extracted title information is written in the body. Note that the title information includes a link to the registered body information, as in the first embodiment.

After the mail is thus created at step S104, digital copying machine 400 sends the created CC-incoming notification mail to a destination indicated as the TO address (S105).

Digital copying machine 400 then repeats the mail creation process (step S104) and the mail transmission process (step S105) in order to send the electronic mail to the users designated by all the extracted CC and BCC addresses, until there is no more destination to receive the mail (S106).

When the CC-incoming notification mail has been sent to all the users designated by the extracted CC and BCC addresses (No at S106), digital copying machine 400 terminates the mail creation process described above.

Note that the CC-incoming notification mail created by the mail creation process above is similar to the mail on the display screen shown in FIG. 9, so that description thereof with reference to a specific example will not be repeated here.

In digital copying machine 400, the process above prevents the body information from being sent to a destination designated by a CC address or a BCC address. Thus, the data volume for electronic mails is reduced. In particular, even if an image file or the like is attached to an electronic mail, the process according to the present embodiment can prevent transmission over the network of a large number of copies of the image file which would otherwise be copied by a required number of destinations designated by CC and BCC addresses. This can alleviate jamming over the network. Moreover, body information is registered as an image file in digital copying machine 400. The user who received the CC-incoming notice can, therefore, view the contents thereof by accessing if need be, without any load on the memory capacity of his/her own client device.

Though the present embodiment showed that the mail information providing program is executed in digital copying machine 400, it is not limited to digital copying machine 400. Any device that has a communication function can be used irrespective of the type of a client device.

While the embodiments herein describe the use of an electronic bulletin board on the Web in the method of providing registered body information, it is not limited thereto. Any method may be adopted in which the user who received a CC-incoming notice can view the body information e.g. by indicating an URL of a location where data is saved.

The body information is registered in a storage portion within the device itself in any of the first to the third embodiments. The body information may, however, be registered in a storage portion of an external device. An electronic mail including information for accessing the body information registered in the storage portion of the external device may then be sent to the CC or BCC destination.

In addition, the method of providing mail information can also be provided as a program. Such a program may be provided as a program product when recorded into a computer readable recording medium such as a flexible disk, a CD-ROM, a ROM, a RAM and a memory card attached to a computer, or a hard disk built in the computer. The program can also be provided by downloading via the network. The program product to be provided is installed into the hard disk and read out onto the RAM for execution. It is noted that the program product includes the program itself and a recording medium in which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mail server, comprising:
an address extraction portion to extract a TO address, a CC address and a BCC address designated as destinations from a received electronic mail;
a body information extraction portion to extract body information from said received electronic mail;
a storage portion to store said extracted body information, the storage portion including a web data storage portion;
a web data creation portion to create web data from the body information and to store the web data on the web data storage portion, the web data being viewable on an electronic bulletin board on a network;
a mail creation portion to create a first electronic mail having said extracted TO address as a destination and including said body information, and a second electronic mail having one of said extracted CC address and BCC address as a destination for notifying that said extracted body information is stored in said storage portion, the second electronic mail not having said body information; and
a controller to provide control such that said created first electronic mail is sent, said extracted body information is stored into said storage portion, and said second electronic mail is sent, when at least one of said CC address and BCC address is designated as a destination for said received electronic mail.

2. The mail server according to claim 1, wherein said controller provides control such that said extracted body information is stored into said storage portion in a viewable state after said first electronic mail is sent or drawn out.

3. The mail server according to claim 1, wherein said controller provides control such that said second electronic mail is sent after said first electronic mail is sent or drawn out.

4. The mail server according to claim 1, wherein said mail creation portion attaches a request for reception confirmation to said first electronic mail, when said extracted TO address is an address required to be transferred to another mail server, and
said controller provides control such that said extracted body information is stored into said storage portion in a viewable state, after said reception confirmation for said first electronic mail is performed.

5. The mail server according to claim 1, wherein said mail creation portion attaches a request for reception confirmation to said first electronic mail, when said extracted TO address is an address required to be transferred to another mail server, and
said controller provides control such that said second electronic mail is sent after said reception confirmation for said first electronic mail is performed.

6. A program product stored in a computer readable medium for a mail server, said program product including instructions to execute the following steps:
an address extraction step of extracting, from a received electronic mail, a TO address, a CC address and a BCC address that are designated as destinations;
a determination step of determining whether or not one of the CC address and the BCC address is designated for said received electronic mail;
a body information extraction step of extracting body information from said received electronic mail, if it is determined in said determination step that at least one of the CC address and BCC address is designated for said received electronic mail;

a first transmission step of sending a first electronic mail including said body information to said extracted TO address;

a storing step of storing said extracted body information into a storage portion, the storage portion including a web data storage portion;

a web data creation step of creating web data from said body information and storing the web data on the web data storage portion, the web data being viewable on an electronic bulletin board on a network; and a second transmission step of sending a second electronic mail to one of said extracted CC address and BCC address for notifying that said extracted body information is stored in said storage portion, the second electronic mail not having said body information.

7. The program product according to claim 6, wherein said storing step stores said extracted body information into said storage portion in a viewable state after said first electronic mail is sent or drawn out.

8. The program product according to claim 6, wherein said second transmission step sends said second electronic mail after said first electronic mail is sent or drawn out.

9. The program product according to claim 6, wherein said first transmission step sends said first electronic mail with a request for reception confirmation attached, when said extracted TO address is an address required to be transferred to another mail server, and said storing step stores said body information into said storage portion in a viewable state after said reception confirmation for said first electronic mail is performed.

10. The program product according to claim 6, wherein said first transmission step sends said first electronic mail with a request for reception confirmation attached, when said extracted TO address is an address required to be transferred to another mail server, and said second transmission step sends said second electronic mail after said reception confirmation of said first electronic mail is performed.

11. A mail server, comprising:

an address extraction portion to extract, from a received electronic mail, a TO address designated as a destination and information on a group constituted by a predetermined user;

a body information extraction portion to extract body information from said received electronic mail;

a storage portion to store said extracted body information, the storage portion including a web data storage portion;

a web data creation portion to create web data from the body information and to store the web data on the web data storage portion, the web data being viewable on an electronic bulletin board on a network;

a mail creation portion to create a first electronic mail having said extracted TO address as a destination and including said body information, and a second electronic mail having said predetermined user constituting said extracted group as a destination for notifying that said extracted body information is stored in said storage portion, the second electronic mail not having said body information; and a controller to provide control such that said created first electronic mail is sent, said extracted body information is stored into said storage portion, and said second electronic mail is sent, when information on said group is designated as a destination for said received electronic mail.

12. The mail server according to claim 11, wherein said controller provides control such that said extracted body information is stored into said storage portion in a viewable state, after said first electronic mail is sent or drawn out.

13. The mail server according to claim 11, wherein said controller provides control such that said second electronic mail is sent after said first electronic mail is sent or drawn out.

14. The mail server according to claim 11, wherein said mail creation portion attaches a request for reception confirmation to said first electronic mail, when said extracted TO address is an address required to be transferred to another mail server, and said controller provides control such that said extracted body information is stored into said storage portion in a viewable state, after said reception confirmation for said first electronic mail is performed.

15. The mail server according to claim 11, wherein said mail creation portion attaches a request for reception confirmation to said first electronic mail, when said extracted TO address is an address required to be transferred to another mail server, and said controller provides control such that said second electronic mail is sent after said reception confirmation for said first electronic mail is performed.

16. A program product stored in a computer readable medium for a mail server, said program product including instructions to execute the following steps:

an address extraction step of extracting, from a received electronic mail, a TO address designated as a destination and information on a group constituted by a predetermined user;

a determination step of determining whether or not the information on said group is designated for said received electronic mail;

a body information extraction step of extracting body information from said received electronic mail, when it is determined at said determination step that the information on said group is designated for said received electronic mail;

a first transmission step of sending a first electronic mail including said body information to said extracted TO address;

a storing step of storing said extracted body information into a storage portion, the storage portion including a web data storage portion;

a web data creation step of creating web data from said body information and storing the web data on the web data storage portion, the web data being viewable on an electronic bulletin board on a network; and a second transmission step of sending a second electronic mail to said predetermined user constituting said extracted group for notifying that said extracted body information is stored in said storage portion, the second electronic mail not having said body information.

17. The program product according to claim 16, wherein said storing step stores said extracted body information into said storage portion in a viewable state after said first electronic mail is sent or drawn out.

18. The program product according to claim 16, wherein said second transmission step sends said second electronic mail after said first electronic mail is sent or drawn out.

19. The program product according to claim 16, wherein said first transmission step sends said first electronic mail with a request for reception confirmation attached, when said extracted TO address is an address required to be transferred to another mail server, and
said storing step stores said extracted body information into said storage portion in a viewable state after said reception confirmation for said first electronic mail is performed.

20. The program product according to claim 16, wherein said first transmission step sends said first electronic mail with a request for reception confirmation attached, when said extracted TO address is an address required to be transferred to another mail server, and
said second transmission step sends said second electronic mail after said reception confirmation of said first electronic mail is performed.

21. The mail server according to claim 1, wherein said controller provides control such that said extracted body information is stored on said web data storage portion in a viewable state after said first electronic mail is opened.

* * * * *